US012613482B2

(12) United States Patent
Taniguchi et al.

(10) Patent No.: US 12,613,482 B2
(45) Date of Patent: Apr. 28, 2026

(54) IMAGE FORMING APPARATUS

(71) Applicant: CANON KABUSHIKI KAISHA, Tokyo (JP)

(72) Inventors: Hisashi Taniguchi, Shizuoka (JP); Kodai Hayashi, Shizuoka (JP); Takuto Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/898,368

(22) Filed: Sep. 26, 2024

(65) Prior Publication Data

US 2025/0110420 A1 Apr. 3, 2025

(30) Foreign Application Priority Data

Sep. 29, 2023 (JP) ................................ 2023-169335

(51) Int. Cl.

| | |
|---|---|
| ***G03G 15/043*** | (2006.01) |
| ***G03G 15/08*** | (2006.01) |
| ***G03G 21/00*** | (2006.01) |

(52) U.S. Cl.

CPC ....... *G03G 15/043* (2013.01); *G03G 15/0844* (2013.01); *G03G 15/0863* (2013.01); *G03G 21/0011* (2013.01); *G03G 2215/0617* (2013.01)

(58) Field of Classification Search

CPC ............. G03G 15/0844; G03G 15/751; G03G 21/011; G03G 2221/1609

See application file for complete search history.

(56) References Cited

U.S. PATENT DOCUMENTS 6,014,530 A * 1/2000 Tsunemi ............ G03G 21/0005 399/53
2006/0093409 A1* 5/2006 Kyung ............... G03G 15/0121 399/299

(Continued)

FOREIGN PATENT DOCUMENTS

JP 4027407 B2 12/2007
JP 2015187707 A 10/2015

(Continued)

OTHER PUBLICATIONS

Machine Translation of JP2020-101774. Jul. 2, 2020. (Year: 2020).*

*Primary Examiner* — Carla J Therrien
(74) *Attorney, Agent, or Firm* — Canon U.S.A., Inc. IP Division

(57) ABSTRACT

A region of an image bearing member facing a developer bearing member at a developing portion is set as a first region, a region of the image bearing member facing the developer bearing member at the developing portion after a region of the developer bearing member facing the first region makes one revolution is set as a second region, and a region of the image bearing member between the first region and the second region is set as a third region. A first pattern for performing exposure and a second pattern for not performing exposure or for performing exposure with an exposure amount smaller than an exposure amount used for the first pattern is formed in the third region. A length of the second pattern is larger than a length of the first pattern in a rotational direction, and the first pattern and the second pattern are repetitively formed.

7 Claims, 9 Drawing Sheets

(56) References Cited

U.S. PATENT DOCUMENTS

| | | | | |
|---|---|---|---|---|
| 2011/0013959 | A1* | 1/2011 | Thayer | G03G 21/0005 399/346 |
| 2011/0103810 | A1* | 5/2011 | Yoshida | G03G 15/0848 399/45 |
| 2020/0218195 | A1* | 7/2020 | Hirata | G03G 21/0094 |
| 2022/0091543 | A1* | 3/2022 | Saito | G03G 15/01 |
| 2024/0280933 | A1* | 8/2024 | Kobayashi | G03G 15/5041 |

FOREIGN PATENT DOCUMENTS

| | | | |
|---|---|---|---|
| JP | 2016038591 | A | 3/2016 |
| JP | 2018136456 | A | 8/2018 |
| JP | 2019191510 | A | 10/2019 |
| JP | 2020046510 | A | 3/2020 |
| JP | 2020101774 | A | 7/2020 |

* cited by examiner

FIG.8A EXPOSURE SIGNAL

FIG.8B EXPOSURE SIGNAL

FIG.8C EXPOSURE SIGNAL

IMAGE FORMING APPARATUS

BACKGROUND

Field

Aspects of the present disclosure generally relate to an image forming apparatus.

Description of the Related Art

Some image forming apparatuses such as printers using the electrophotographic image forming method have a configuration in which a process cartridge is detachably attachable to the body of each image forming apparatus. In the process cartridge, a toner image on an image bearing member (hereinafter referred to as a "photosensitive member" or "drum") may partially remain on the drum after being subjected to transfer to a recording material, and, therefore, there is a known method of removing such residual toner by bringing a cleaning member into abutting contact with the surface of the drum. The cleaning member is configured with, as a widely adopted composition, an elastic member made from, for example, urethane rubber and a supporting plate for supporting the elastic member.

Here, when the process cartridge is a new (unused) product, a cleaning blocking layer made from an external additive is not yet formed between the drum and the cleaning member, so that the cleaning performance is also in an unstable state, and, therefore, there is an issue in which a faulty cleaning image may occur.

To deal with this issue, Japanese Patent Application Laid-Open No. 2015-187707 discusses a toner supply sequence which, at the time of use of a new-product process cartridge, efficiently discharges toner to the drum so as to prevent or reduce image defect.

However, in the case of the configuration discussed in Japanese Patent Application Laid-Open No. 2015-187707, there is the following issue. For example, in the early stage at the time of use of a new-product process cartridge, the initial friction coefficient of the drum is high, and, if the amount of toner supply per unit area of the drum in the toner supply sequence is high due to, for example, a low-temperature and low-humidity (L/L) environment (15° C. and 10%), toner may slip through the cleaning member. In that case, an adverse effect may occur in images due to faulty cleaning.

SUMMARY

According to some embodiments, an image forming apparatus includes a rotatable image bearing member, an exposure unit configured to form an electrostatic latent image on a surface of the image bearing member by exposing the surface of the image bearing member, a rotatable developer bearing member configured to, at a developing portion, supply toner to the surface of the image bearing member and develop the electrostatic latent image as a toner image, a cleaning member configured to form a contact portion by coming into contact with the image bearing member and, at the contact portion, remove toner adhering to the surface of the image bearing member, and a control unit configured to, by causing the image bearing member and the developer bearing member to rotate and controlling the exposure unit, perform control to enable performing (i) an image forming operation which forms the toner image on a recording material, and (ii) a toner supply operation which is an operation different from the image forming operation and which supplies the toner to the contact portion by moving the toner from the developer bearing member to the image bearing member, wherein a region of the image bearing member facing the developer bearing member at the developing portion in a state in which the image bearing member and the developer bearing member are rotating is defined as a first region, a region of the image bearing member facing the developer bearing member at the developing portion after a region of the developer bearing member facing the first region makes one revolution is defined as a second region, and a region of the image bearing member between the first region and the second region in a rotational direction of the image bearing member is defined as a third region, wherein, when the toner supply operation is performed, the control unit performs control to form, in the third region, a toner supply pattern which includes a first pattern for exposing a part of the surface of the image bearing member by the exposure unit and a second pattern for not exposing a part of the surface of the image bearing member or for exposing a part of the surface of the image bearing member with an exposure amount smaller than an exposure amount with which the first pattern is used for exposure, and wherein the toner supply pattern is configured so a length of the second pattern is larger than a length of the first pattern in the rotational direction and that the first pattern and the second pattern are repetitively formed.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. Furthermore, the following description is an exemplification, and the present disclosure should not be construed to be limited to the contents of the following description. Moreover, in the respective drawings described below, constituent elements which are unnecessary for description of the exemplary embodiments are omitted from description as appropriate. Furthermore, for convenience sake, the largeness and smallness (highness and lowness) of a voltage or current is assumed to, unless particularly otherwise described, refer to the largeness and smallness (highness and lowness) obtained in a case where voltages or currents are compared by absolute value.

<Overall Configuration of Image Forming Apparatus>

Figure 1:
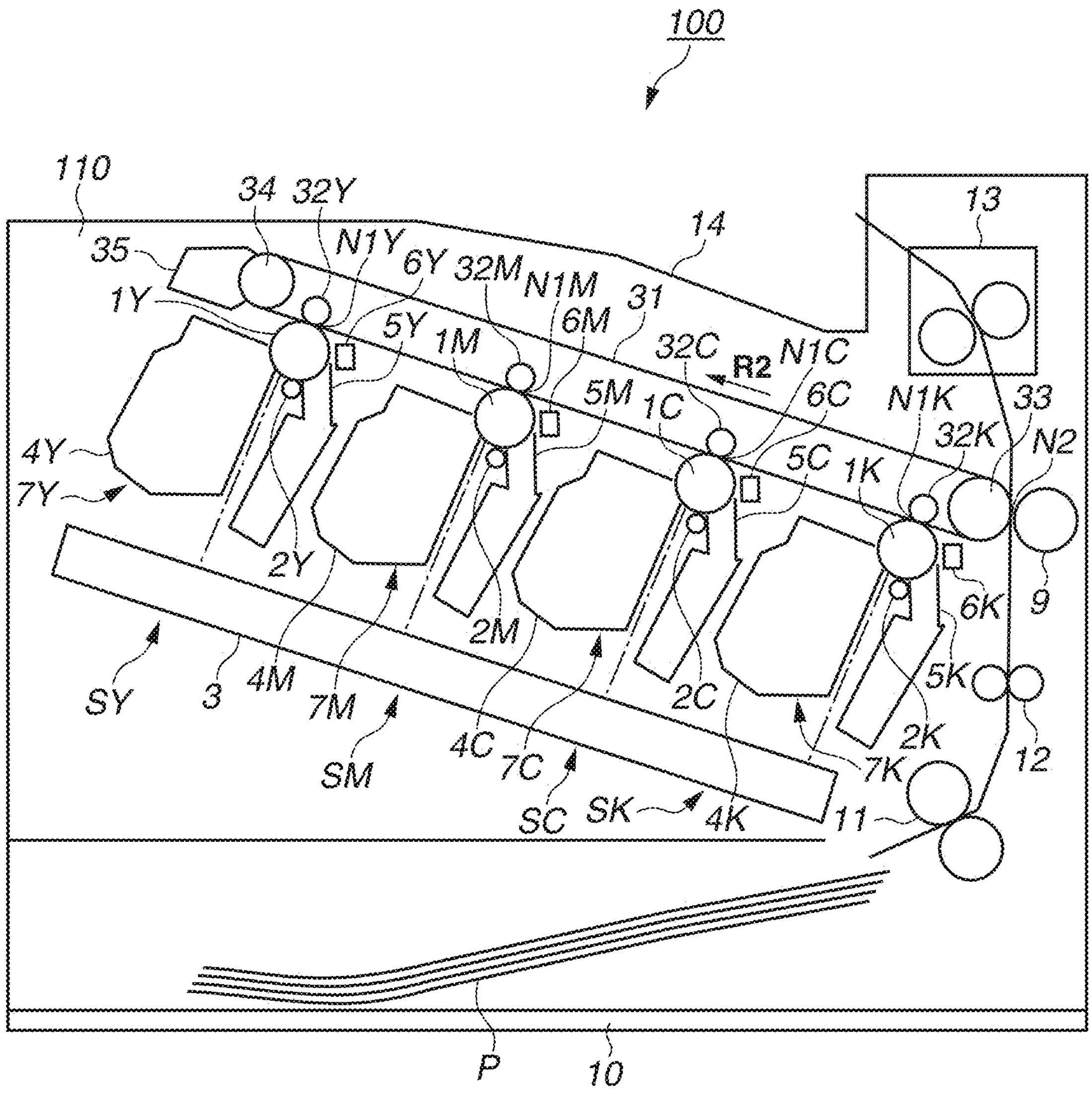
FIG. 1 is an outline sectional view of an image forming apparatus in an exemplary embodiment 1.

First, an overall configuration of an image forming apparatus in an exemplary embodiment 1 is described. FIG. 1 is an outline sectional view of the image forming apparatus 100 in the exemplary embodiment 1. The image forming apparatus 100 in the exemplary embodiment 1 is a full-color laser printer employing the in-line method and the intermediate transfer method. The image forming apparatus 100 is able to form a full-color image on a sheet-shaped recording material P (for example, recording paper, plastic sheet, or cloth) according to image information. The image information is input from an external apparatus (not illustrated), such as an image reading apparatus or a personal computer connected to the image forming apparatus 100 in such a way as to be able to communicate with the image forming apparatus 100, to the image forming apparatus 100.

Figure 2:
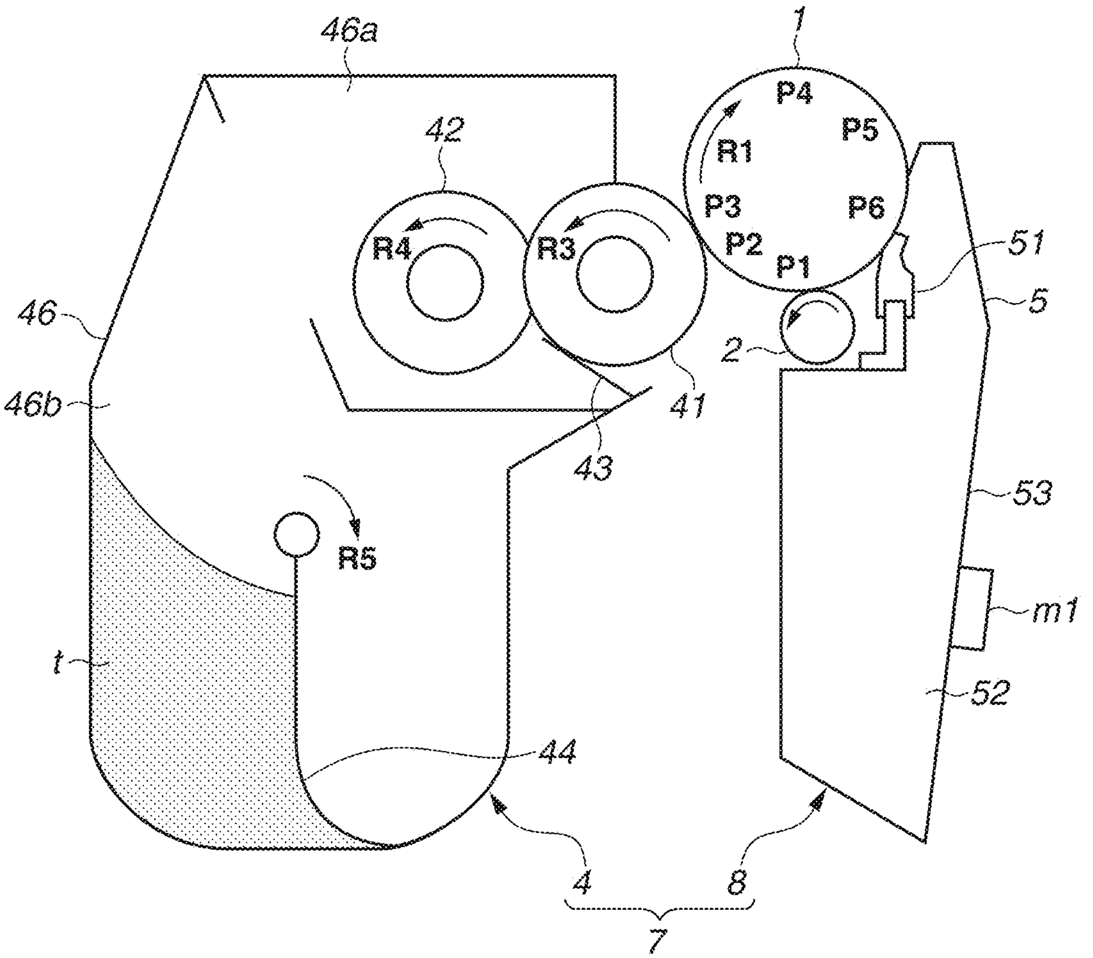
FIG. 2 is an outline sectional view of a process cartridge in the exemplary embodiment 1.

The image forming apparatus 100 includes, as a plurality of image forming portions, first, second, third, and fourth image forming portions SY, SM, SC, and SK for forming images of colors of yellow (Y), magenta (M), cyan (C), and black (K), respectively. The identical or corresponding elements provided for the respective colors may be comprehensively described while suffixes Y, M, C, and K of the reference characters indicating an element for which of the colors the element concerned is are omitted. In the exemplary embodiment 1, the image forming portion S is configured with a photosensitive member 1 serving as an image bearing member described below, a charging roller 2 serving as a charging member, an exposure device 3 serving as an exposure unit, a developing device 4 serving as a developing unit, and a cleaning device 5 serving as a cleaning unit. In the exemplary embodiment 1, the image forming portion S is configured to further include, for example, a pre-exposure device 6 serving as a pre-exposure unit. While, in the exemplary embodiment 1, the exposure device 3 is configured as one unit for exposing the photosensitive member 1 of each image forming portion S, a plurality of exposure devices 3 can be independently provided for the respective image forming portions S. In each image forming portion S, the photosensitive member 1 and the charging roller 2, the developing device 4, and the cleaning device 5, which serve as a process unit acting on the photosensitive member 1, are unified to constitute a process cartridge 7. FIG. 2 is an outline sectional view representatively illustrating one process cartridge 7.

The rotatable drum-shaped (cylindrical) photosensitive member (photosensitive drum) 1, serving as an image bearing member which bears an electrostatic latent image and a toner image thereon, is driven to rotate in the direction of arrow R1 (clockwise direction) in FIG. 2 by a driving force transmitted from a driving portion 80 (FIG. 3) serving as a driving unit. In the exemplary embodiment 1, four photosensitive member 1 are arranged side by side in a direction intersecting with the vertical direction. In the exemplary embodiment 1, the rotational speed of the photosensitive member 1 is set to 321 millimeters per second (mm/sec) as a speed in the normal mode. Although described below, the speed in the low-speed mode, in which the rotational speed of the photosensitive member 1 is lower than that in the normal mode, is set to 91 mm/sec. The rotational speed of the photosensitive member 1 is also a speed at which to perform an imaging process in the image forming operation and, therefore, may be collectively referred to as a "process speed (PS)".

The surface of the photosensitive member 1 rotating is subjected to charging processing to a predetermined electric potential with a predetermined polarity (in the exemplary embodiment 1, the negative polarity) by the charging roller 2, which is a roller-shaped charging member serving as a charging unit. In the exemplary embodiment 1, the charging roller 2 is a single-layer roller configured with a conductive core metal and a conductive rubber layer (elastic layer) provided around the core metal, and is 7.5 mm in outer diameter and $10^3$ ohm-centimeter (Ω·cm) to $10^6$ Ω·cm in volume resistivity. The charging roller 2 is arranged in abutting contact with the surface of the photosensitive member 1, is pressed toward the photosensitive member 1, and is driven to rotate by the rotation of the photosensitive member 1. At the time of image formation (the time of charging processing), a predetermined charging voltage (charging bias), which is a direct-current (DC) voltage with a predetermined polarity (in the exemplary embodiment 1, the negative polarity), is applied to the charging roller 2 by a charging power source (high-voltage power source) 71 (FIG. 3) serving as a charging voltage application portion. In the exemplary embodiment 1, in response to a charging voltage of −1000 volts (V) being applied to the charging roller 2, the surface of the photosensitive member 1 is uniformly subjected to charging processing to −500 V, which is a voltage Vd serving as a dark portion potential (non-image portion potential). Thus, a charging voltage "Vd+Vth", which is a direct-current voltage, is applied to the charging roller 2, so that the surface of the photosensitive member 1 is uniformly subjected to charging processing to the voltage Vd by electric discharge. Here, the voltage Vd is a dark portion potential (non-image portion potential) and is −500 V in the exemplary embodiment 1. Moreover, the voltage Vth is a discharge starting voltage and is −500 V in the exemplary embodiment 1. While, in a case where the charging voltage to be applied to the charging roller 2 is small, the surface potential on the photosensitive member 1 does not increase by electric discharge, when the charging voltage to be applied to the charging roller 2 becomes equal to or higher than the discharge starting voltage Vth, the surface potential on the photosensitive member 1 becomes increasing by electric discharge. The position at which the charging processing of the surface of the photosensitive member 1 is performed by the charging roller 2 in the rotational direction of the photosensitive member 1 is a charging portion (charging position) P1. In the exemplary embodiment 1, the charging processing of the surface of the photosensitive member 1 is performed by electric discharge occurring at a minute air gap which is formed at the upstream side and downstream of an abutting contact portion between the photosensitive member 1 and the charging roller 2 in the rotational direction of the photosensitive member 1. However, for sake of simplicity, the abutting contact portion between the photosensitive member 1 and the charging roller 2 can be considered as the charging portion P1.

The surface of the photosensitive member 1 subjected to charging processing is scanned and exposed by the exposure device 3, serving as an exposure unit, so that an electrostatic latent image (electrostatic image) is formed on the photosensitive member 1. The exposure device 3 radiates laser light onto the surface of the photosensitive member 1 based on image information, thus forming an electrostatic latent image on the photosensitive member 1.

With regard to the surface of the photosensitive member 1 irradiated with laser light, the surface potential changes to −100 V, which is a light portion potential (image portion potential) V1. The position at which radiation of light to the surface of the photosensitive member 1 by the exposure device 3 is performed in the rotational direction of the photosensitive member 1 is an exposure portion (exposure position) P2.

The electrostatic latent image formed on the photosensitive member 1 is supplied with toner serving as a developer by the developing device 4 serving as an exposure unit and is thus developed (made visible), so that a toner image (developer image) is formed on the photosensitive member 1. The developing device 4 includes a developing roller 41 serving as a developing member (developer bearing member). The diameter p of the developing roller 41 is set to 12 mm, and the circumferential speed ratio of the developing roller 41 relative to the rotational speed of the photosensitive member 1 is 90%. At the time of image formation (the time of development), a predetermined developing voltage (developing bias), which is a direct-current (DC) voltage with a predetermined polarity (in the exemplary embodiment 1, the negative polarity), is applied to the developing roller 41 by a developing power source (high-voltage power source) 72 (FIG. 3) serving as a developing voltage application portion. In the exemplary embodiment 1, in response to a developing voltage Vdc of −300 V being applied to the developing roller 41, toner adheres to the portion of the light portion potential V1 on the photosensitive member 1. In this way, in the exemplary embodiment 1, toner charged to the same polarity (in the exemplary embodiment 1, the negative polarity) as the charging polarity of the photosensitive member 1 adheres to the image portion on the photosensitive member 1 which has decreased in electric potential by being exposed after being uniformly subjected to charging processing (reversal development method). In the exemplary embodiment 1, the normal charging polarity of toner, which is a principal charging polarity of toner at the time of development, is the negative polarity. The developing device 4 is described below in further detail. The position at which supplying of toner to the surface of the photosensitive member 1 by the developing device 4 is performed in the rotational direction of the photosensitive member 1 (in the exemplary embodiment 1, an abutting contact portion between the photosensitive member 1 and the developing roller 41) is a developing portion (developing position) P3.

An intermediate transfer belt 31, which is configured with an endless belt serving as an intermediate transfer member, is arranged opposite four photosensitive members 1. The intermediate transfer belt 31 is stretched around a driving roller 33 and a tension roller 34 serving as a plurality of tensile suspension rollers and is suspended in a tensioned manner at a predetermined tensile force. In response to the driving roller 33 being driven to rotate by a driving force transmitted from a driving portion 80 (FIG. 3) serving as a driving unit, the intermediate transfer belt 31 rotates (circularly moves or revolvingly moves) in the direction of arrow R2 (counterclockwise direction) in FIG. 1. On the inner circumferential surface side of the intermediate transfer belt 31, primary transfer rollers 32, each of which is a roller-shaped primary transfer member serving as a primary transfer unit, are arranged opposite the respective photosensitive members 1 via the intermediate transfer belt 31. The primary transfer roller 32 is pressed toward the photosensitive member 1 and is in abutting contact with the photosensitive member 1 via the intermediate transfer belt 31, thus forming a primary transfer portion (primary transfer nip) N1, at which the photosensitive member 1 and the intermediate transfer belt 31 are in abutting contact with each other. At the primary transfer portion N1, by the action of the primary transfer roller 32, the toner image formed on the photosensitive member 1 is transferred (primarily transferred) onto the intermediate transfer belt 31, which is rotating, serving as an object destined for transfer. At the time of image formation (the time of primary transfer), a primary transfer voltage (primary transfer bias), which is a direct-current voltage with a polarity (in the exemplary embodiment 1, the positive polarity) opposite to the normal charging polarity of toner, is applied to the primary transfer roller 32 by a primary transfer power source (high-voltage power source) 73 (FIG. 3) serving as a primary transfer voltage application portion. For example, at the time of formation of a full-color image, toner images of yellow (Y), magenta (M), cyan (C), and black (K) formed on the respective photosensitive members 1 are sequentially transferred in such a way as to be superposed on each other on the intermediate transfer belt 31. The position at which transfer of a toner image from the surface of the photosensitive member 1 to the intermediate transfer belt 31 is performed, in the rotational direction of the photosensitive member 1, is a primary transfer portion P4 (in the exemplary embodiment 1, the above-mentioned primary transfer portion N1, which is an abutting contact portion between the photosensitive member 1 and the intermediate transfer belt 31).

On the outer circumferential surface side of the intermediate transfer belt 31, a secondary transfer roller 9, which is a roller-shaped secondary transfer member serving as a secondary transfer unit, is arranged at a position opposite to the driving roller 33, which also serves as a secondary transfer counter roller. The secondary transfer roller 9 is pressed toward the driving roller 33 and is in abutting contact with the driving roller 33 via the intermediate transfer belt 31, thus forming a secondary transfer portion (secondary transfer nip) N2, at which the intermediate transfer belt 31 and the secondary transfer roller 9 are in abutting contact with each other. At the secondary transfer portion N2, the toner image formed on the intermediate transfer belt 31 is transferred (secondarily transferred) to a recording material P serving as an object destined for transfer, which is being conveyed while being nipped between the intermediate transfer belt 31 and the secondary transfer roller 9.

At the time of image formation (the time of secondary transfer), a secondary transfer voltage (secondary transfer bias), which is a direct-current voltage with a polarity (in the exemplary embodiment 1, the positive polarity) opposite to the normal charging polarity of toner, is applied to the secondary transfer roller 9 by a secondary transfer power source (high-voltage power source) 74 (FIG. 3) serving as a secondary transfer voltage application portion. The recording material (transfer material, recording medium, or sheet) P is contained in a cassette 10 serving as a recording material container portion, is put out from the cassette 10 by, for example, a feed roller 11 serving as a feeding member, and is sent to a registration roller 12 serving as a conveyance member. The recording material P is conveyed by the registration roller 12 to the secondary transfer portion N2 in conformity in timing with the toner image on the intermediate transfer belt 31.

The recording material P with the toner image transferred thereto is conveyed to a fixing device 13 serving as a fixing unit. The fixing device 13 applies heat and pressure to the recording material P with the unfixed toner image transferred thereto, thus fixing (fusing and attaching or firmly fixing) the toner image to the recording material P. The recording material P with the toner image fixed thereto is discharged (output) to a tray 14 serving as a discharging portion provided at the exterior of the apparatus body 110 of the image forming apparatus 100.

On the other hand, the surface potential of the photosensitive member 1 obtained after the toner image is transferred to the intermediate transfer belt 31 has become uneven due to reception of the primary transfer voltage. In response to the surface of the photosensitive member 1 being preliminarily exposed (exposed in whole surface or irradiated with light in whole surface) by the pre-exposure device 6 serving as a charge removing unit, the surface potential of the photosensitive member 1, which has become uneven by the previous image formation, is made uniformly even. Thus, residual electric charge on the surface of the photosensitive member 1 is removed by pre-exposure. The pre-exposure device 6 exposes the surface of the photosensitive member 1 on the downstream side of the primary transfer portion P4 and on the upstream side of the charging portion P1 in the rotational direction of the photosensitive member 1. The light source of the pre-exposure device 6 to be usable includes, for example, a light-emitting diode (LED) or a halogen lamp. While the light source to be used is not particularly limited, from the viewpoint of a driving voltage being low and a reduction in size of the apparatus being easy, it is favorable to use an LED. In the exemplary embodiment 1, an LED is used as the light source of the pre-exposure device 6. The position at which radiation of light to the surface of the photosensitive member 1 is performed by the pre-exposure device 6 in the rotational direction of the photosensitive member 1 is a pre-exposure portion (pre-exposure position) P5.

Moreover, toner remaining on the surface of the photosensitive member 1 without being transferred to the intermediate transfer belt 31 (primary transfer residual toner) is removed and recovered from the surface of the photosensitive member 1 by the cleaning device 5 serving as a photosensitive member cleaning unit. The cleaning device 5 scrapes off the transfer residual toner from the surface of the photosensitive member 1 rotating by a cleaning blade 51 serving as a cleaning member which is in abutting contact with the surface of the photosensitive member 1. A contact portion P6 is formed by the cleaning blade 51 and the surface of the photosensitive member 1 being in abutting contact with each other, thus forming a nip portion in which a blocking layer is formed at the contact portion P6. The scraped-off toner is then put into a waste toner containing chamber 52 provided below the cleaning blade 51. While, in the exemplary embodiment 1, since description is performed even with regard to an initial state in which the blocking layer is not yet formed at the contact portion P6, a distinction is made between the contact portion P6 and the nip portion for descriptive purposes, after toner or an external additive is supplied to the contact portion P6, the contact portion P6 and the nip portion are used in the same meaning. The setting condition for the cleaning blade 51 in the exemplary embodiment 1 is as follows. The angle of setting of the cleaning blade 51 relative to the photosensitive member 1 is set to 22°, the amount of penetration of the cleaning blade 51 into the photosensitive member 1 is set to 1.0 mmm, and the hardness of the cleaning blade 51 is set to 70 degrees (Asker-C, 500 gram-force (gf) in load).

Moreover, an adhering article such as toner (secondary transfer residual toner) remaining on the surface of the intermediate transfer belt 31 without being transferred to the recording material P is removed and recovered from the surface of the intermediate transfer belt 31 by a belt cleaning device 35 serving as an intermediate transfer member cleaning unit.

Figure 3:
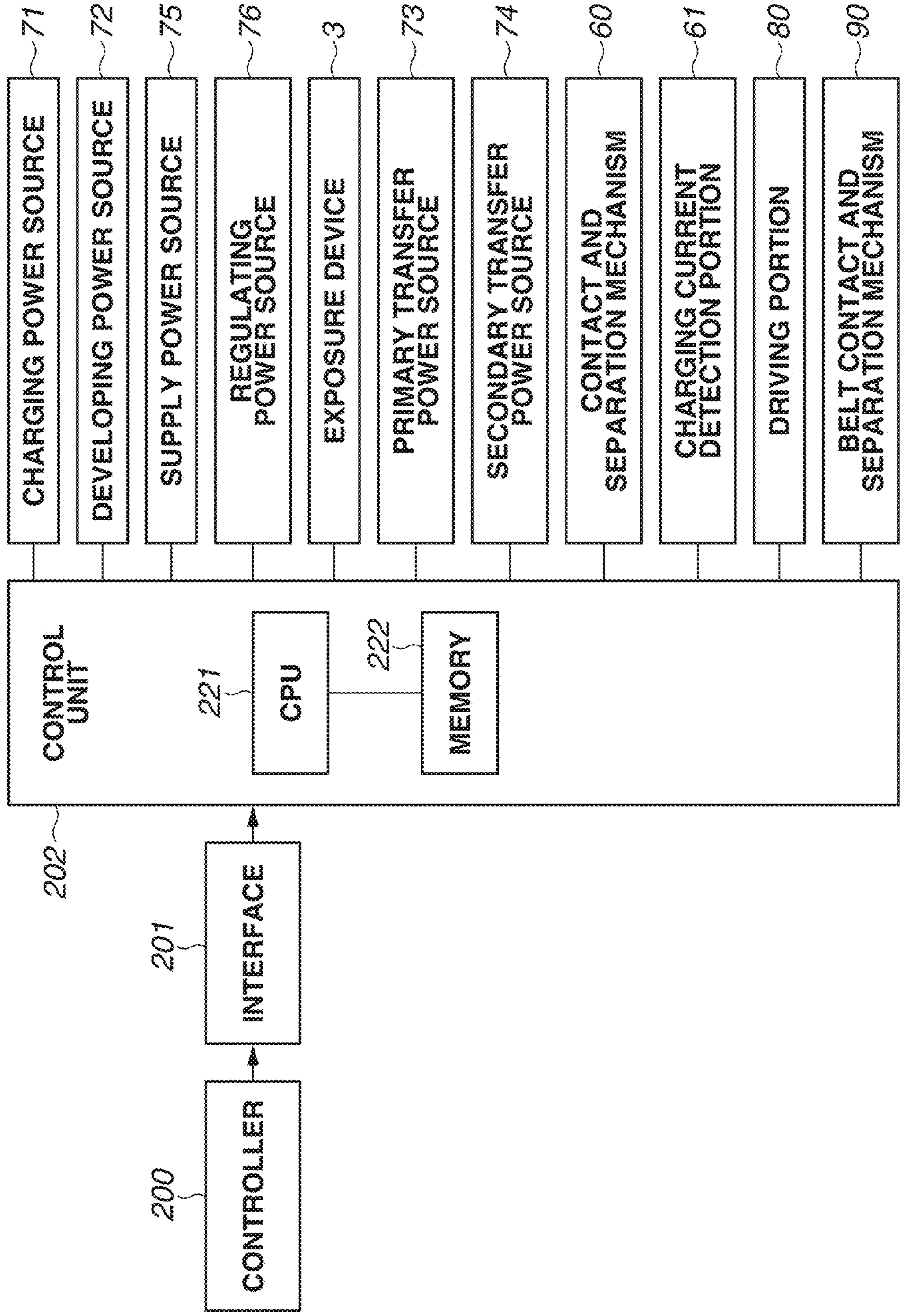
FIG. 3 is a block diagram illustrating a control configuration of the image forming apparatus in the exemplary embodiment 1.

Furthermore, the intermediate transfer belt 31 is configured to be able to come into abutting contact with and separate from the photosensitive members 1 by a belt contact and separation mechanism 90 (FIG. 3). In the exemplary embodiment 1, the belt contact and separation mechanism 90 is configured to separate the intermediate transfer belt 31 from the photosensitive members 1 by moving the primary transfer rollers 32 in a direction away from the photosensitive members 1. Moreover, the belt contact and separation mechanism 90 is configured to bring the intermediate transfer belt 31 into abutting contact with the photosensitive members 1 by moving the primary transfer rollers 32 in a direction closer to the photosensitive members 1.

<Configuration of Process Cartridge>

Next, the process cartridge 7, which is configured to be set in the image forming apparatus 100 in the exemplary embodiment 1, is described. FIG. 2 is an outline sectional view of the process cartridge 7 as viewed in the rotational axis direction of the photosensitive member 1.

The process cartridge 7 is configured to be attachable to and detachable from the apparatus body 110 of the image forming apparatus 100 via a mounting unit (not illustrated) such as a mounting guide or a positioning member provided in the image forming apparatus 100. In the exemplary embodiment 1, the apparatus body 110 is a section obtained by excluding the process cartridge 7 from the image forming apparatus 100. In the exemplary embodiment 1, all of the process cartridges 7 for the respective colors have the same shape, and toners t of respective colors yellow (Y), magenta (M), cyan (C), and black (K) are contained in the process cartridges 7 for the respective colors, respectively. Furthermore, in the exemplary embodiment 1, the configurations and operations of the process cartridges 7 for the respective colors are substantially the same except for the types (colors) of the contained toners t. The process cartridge 7 includes a developing device (developing unit) 4 and a photosensitive member unit 8.

The developing device (developing unit) 4 includes a developing container (developing frame member) 46. The developing container 46 is comparted into a developing chamber 46*a* and a toner containing chamber (developer containing portion) 46*b*.

Toner t, which is a nonmagnetic one-component developer, is contained in the toner containing chamber 46*b*. A toner conveyance member (developer conveyance member) 44 is provided inside the toner containing chamber 46*b*. The toner conveyance member 44 is driven to rotate in the direction of arrow R5 (clockwise direction) in FIG. 2 by a driving force transmitted from the driving portion 80 (FIG. 3) serving as a driving unit, thus conveying the toner t to the developing chamber 46*a*.

The developing roller 41 serving as a developing member (developer bearing member) is arranged in the developing chamber 46*a*. At the time of image formation (the time of development), the developing roller 41 is brought into abutting contact with the photosensitive member 1 and is driven to rotate in the direction of arrow R3 (counterclockwise direction) in FIG. 2 by a driving force transmitted from the driving portion 80 serving as a driving unit. In the exemplary embodiment 1, each of the developing roller 41 and the photosensitive member 1 rotates in such a manner that the respective surfaces of the developing roller 41 and the photosensitive member 1 move in the same direction at the developing portion P3, at which the developing roller 41 and the photosensitive member 1 face each other (are in abutting contact with each other). In the exemplary embodiment 1, the developing roller 41 is configured with a conductive core metal and a conductive rubber layer (elastic layer) provided around the core metal. Furthermore, the rotational direction of the developing roller 41 is not limited to the rotational direction mentioned in the exemplary embodiment 1, but can be such a rotational direction that the respective surfaces of the developing roller 41 and the photosensitive member 1 move in opposite directions at the developing portion P3.

Moreover, a supply roller 42 serving as a supply member which supplies the toner t conveyed from the toner containing chamber 46*b* to the developing roller 41 is arranged in the developing chamber 46*a*. The supply roller 42 is arranged in abutting contact with the developing roller 41. At the time of image formation (the time of development), the supply roller 42 is driven to rotate in the direction of arrow R4 (counterclockwise direction) in FIG. 2 by a driving force transmitted from the driving portion 80 serving as a driving unit. In the exemplary embodiment 1, each of the supply roller 42 and the developing roller 41 rotates in such a manner that the respective surfaces of the supply roller 42 and the developing roller 41 move in opposite directions at an abutting contact portion between the supply roller 42 and the developing roller 41. The rotational direction of the supply roller 42 is not limited to the rotational direction mentioned in the exemplary embodiment 1, but can be such a rotational direction that the respective surfaces of the supply roller 42 and the developing roller 41 move in the same direction at an abutting contact portion between the supply roller 42 and the developing roller 41.

Additionally, a developing blade 43 serving as a regulating member which regulates the amount of coating of the toner t on the developing roller 41 supplied by the supply roller 42 and performs application of electric charge to the toner t is arranged in the developing chamber 46*a*.

Respective independent voltages are applied from high-voltage power sources to the developing roller 41, the supply roller 42, and the developing blade 43. The toner t supplied to the developing roller 41 by the supply roller 42 is subjected to triboelectric charging by friction between the developing roller 41 and the developing blade 43, so that electric charge is applied to the toner t and the layer thickness of the toner t is regulated. The toner t with the layer thickness thereof regulated on the developing roller 41 is conveyed to the developing portion P3, which is a facing portion (abutting contact portion) between the developing roller 41 and the photosensitive member 1, by the rotation of the developing roller 41, and then adheres to an image portion of the electrostatic latent image on the photosensitive member 1, thus forming a toner image on the photosensitive member 1.

At the time of image formation (the time of development), a predetermined developing voltage (developing bias) Vdc, which is a direct-current voltage with a predetermined polarity (in the exemplary embodiment 1, the negative polarity), is applied to the developing roller 41 by the developing power source (high-voltage power source) 72 (FIG. 3) serving as a developing voltage application portion. In the exemplary embodiment 1, the developing voltage Vdc is set to −300 V. This causes a developing contrast Vcont (=Vl−Vdc), which is an electric potential difference between the light portion potential Vl on the photosensitive member 1 and the developing bias (the electric potential of the developing roller 41), at the developing portion P3 to become +200 V. Moreover, at the time of image formation (the time of development), a predetermined supply voltage (supply bias) Vrs, which is a direct-current voltage with a predetermined polarity (in the exemplary embodiment 1, the negative polarity) is supplied to the supply roller 42 by a supply power source (high-voltage power source) 75 (FIG. 3) serving as a supply voltage application portion. In the exemplary embodiment 1, the supply voltage Vrs is set to −350 V. Adjusting the electric potential difference (ΔVr) between the supply roller 42 and the developing roller 41 enables adjusting the amount of supply of toner t to the developing roller 41. In the exemplary embodiment 1, the electric potential difference ΔVr (=Vdc−Vrs) is set to +50 V. This sets the electric potential setting owing to which the negatively chargeable toner t is likely to move from the supply roller 42 to the developing roller 41. Moreover, at the time of image formation (the time of development), a predetermined regulating voltage (regulating bias), which is a direct-current voltage with a predetermined polarity (in the exemplary embodiment 1, the negative polarity) is supplied to the developing blade 43 by a regulating power source (high-voltage power source) 76 (FIG. 3) serving as a regulating voltage application portion. In the exemplary embodiment 1, the regulating voltage is set to −350 V as with the supply voltage. Furthermore, the setting of, for example, the above-mentioned developing bias Vdc is a default setting in a state in which the apparatus body 110 and the process cartridge 7 are new products.

Furthermore, as mentioned above, the largeness and smallness (highness and lowness) of a voltage or current is assumed to, unless particularly otherwise described, refer to the largeness and smallness (highness and lowness) obtained in a case where voltages or currents are compared by absolute value. Thus, with regard to electric potential or applied voltage, the absolute value being larger on the negative polarity side (for example, −1000 V relative to −500 V) refers to the electric potential being higher, and the absolute value being smaller on the negative polarity side (for example, −300 V relative to −500 V) refers to the electric potential being lower. This is because, in the exemplary embodiment 1, the largeness and smallness (highness and lowness) of a voltage or current is considered based on the negatively chargeable toner t.

Moreover, the voltage is expressed as an electric potential difference relative to the ground potential (0 V). Accordingly, the developing voltage being −300 V means that an electric potential difference of −300 V is provided relative to the ground potential by the developing voltage applied to the core metal of the developing roller 41. This also applies to the other types of voltages such as a charging voltage.

The photosensitive member unit 8 includes a photosensitive member unit container (photosensitive member unit frame member) 53. The photosensitive member 1 is rotatably mounted to the photosensitive member unit container 53 via bearings (not illustrated). The photosensitive member 1 is driven to rotate in the direction of arrow R1 (clockwise direction) in FIG. 2 by receiving a driving force transmitted from the driving portion 80 (FIG. 3) serving as a driving unit. Moreover, the charging roller 2 and the cleaning blade 51, which is a plate-like elastic member, are arranged in the photosensitive member unit 8 in such a way as to be in contact with the surface (outer circumferential surface) of the photosensitive member 1. The charging roller 2 is rotatably mounted to the photosensitive member unit container 53 via bearings (not illustrated). The cleaning blade 51 has one end portion (fixed end portion) which is fixed to a plate-like metallic plate mounted to the photosensitive member unit container 53 and the other end portion (free end portion) which is in abutting contact with the photosensitive member 1 to form a cleaning nip serving as an abutting contact portion with the photosensitive member 1. The cleaning blade 51 frictionally slides on the surface of the photosensitive member 1 to scrape off toner t and fine particles remaining on the photosensitive member 1 after the primary transfer process, and puts the scraped ones in the waste toner containing chamber 52, which is formed inside the photosensitive member unit container 53. This enables preventing or reducing an image from becoming unable to be appropriately formed due to toner t adhering to the charging roller 2 or toner t rotationally moving along with the photosensitive member 1. The cleaning device 5 is configured with the cleaning blade 51 and the waste toner containing chamber 52 (photosensitive member unit container 53).

Moreover, the image forming apparatus 100 includes a contact and separation mechanism 60, which is configured to bring the developing rollers 41 into abutting contact with the respective photosensitive members 1 and separate the developing rollers 41 from the respective photosensitive members 1. In the exemplary embodiment 1, the developing container 46 is coupled to the photosensitive member unit container 53 in a swingable manner, and the developing container 46 is urged in a direction to cause the developing roller 41 to come into abutting contact with the photosensitive member 1 by a pressure spring, which is an urging member serving as an urging unit. The contact and separation mechanism 60 is configured to be able to separate the developing roller 41 from the photosensitive member 1 by moving (turning) the developing container 46 against an urging force of the above-mentioned pressure spring. Moreover, the contact and separation mechanism 60 is configured to be able to bring the developing roller 41 into abutting contact with the photosensitive member 1 by allowing the developing container 46 to move (turn) by an urging force of the above-mentioned pressure spring. In the exemplary embodiment 1, at the time of stoppage of the image forming apparatus 100, the developing roller 41 is separated from the photosensitive member 1 by the contact and separation mechanism 60. Then, at the time of image formation (the time of development), the developing roller 41 is brought into abutting contact with the photosensitive member 1 by the contact and separation mechanism 60. The contact and separation mechanism 60 is driven by a driving force transmitted from the driving portion 80 (FIG. 3) serving as a driving unit.

<Control Configuration of Image Forming Apparatus>

Next, a control configuration of the image forming apparatus 100 in the exemplary embodiment 1 is described. FIG. 3 is a block diagram illustrating a control configuration of a main section of the image forming apparatus 100 in the exemplary embodiment 1.

The image forming apparatus 100 includes a control unit 202, which controls an operation of the image forming apparatus 100. Signal indicating various types of information are input to the control unit 202 via electrical connections, and are output from the control unit 202 via electrical connections. The control unit 202 performs processing of signals which have been input from various process devices or sensors, and performs processing of signals which are to be output to issue instructions for operations of various process devices. A controller 200 provided in the image forming apparatus 100 performs inputting and outputting of various signals with an external device (host device), and performs inputting and outputting of various signals with the control unit 202 via an interface 201 provided in the image forming apparatus 100. In response to instructions issued by the controller 200, the control unit 202 comprehensively controls an operation of the image forming apparatus 100 according to a predetermined control program and a reference table.

The control unit 202 includes, for example, a central processing unit (CPU) 221, which serves a computation processing unit being a central element for performing various arithmetic processing operations, and a body memory 222, including, for example, a random access memory (RAM), a read-only memory (ROM), and a non-volatile memory, each of which is a storage element serving as a storage unit for storing information. In the RAM, for example, detection results provided by sensors, results of counting by counters, and computation results are temporarily stored. Moreover, in the ROM, for example, control programs and data tables previously obtained by, for example, experiments. Moreover, in the non-volatile memory, for example, results of counting by counters, various pieces of setting information, and results provided by sensors are stored. To the control unit 202, for example, various control targets in the image forming apparatus 100, sensors, and counters are connected. The control unit 202 controls, for example, inputting and outputting of various signals and timing of driving of various portions, thus performing, for example, control of a predetermined image forming sequence.

The control unit 202 controls, for example, the charging power source 71, the developing power source 72, the supply power source 75, the regulating power source 76, the exposure device 3, the primary transfer power source 73, the secondary transfer power source 74, and the driving portion 80. Additionally, the control unit 202 controls the contact and separation mechanism 60, a charging current detection portion (charging current detection circuit) 61, which detects a charging current flowing through the charging portion P1 (the charging roller 2 and the charging power source 71), and the belt contact and separation mechanism 90.

Although omitted from illustration, in the exemplary embodiment 1, the charging power source 71, the developing power source 72, the supply power source 75, the regulating power source 76, the primary transfer power source 73, the contact and separation mechanism 60, and the charging current detection portion 61 are independently provided for each image forming portion S. Moreover, the driving portion 80 is configured to include, for example, a driving motor, serving as a driving source, and a driving transmission member. Respective driving sources for driving the photosensitive member 1, the intermediate transfer belt 31, a rotary member of the developing device 4, the contact and separation mechanism 60, and the belt contact and separation mechanism 90 can be independently provided, or at least a part of them can be shared. Moreover, driving sources for driving elements for respective colors can be independently provided, or at least a part of them can be shared.

Here, the image forming apparatus 100 performs an image forming operation (print job), which is started in response to one start instruction and is a series of operations for forming an image or images on a single or a plurality of recording materials P and then outputting the recording material or materials P with image or images formed thereon. The image forming operation includes, generally, an image forming process, a pre-process (pre-rotation process or pre-print operation), an inter-sheet process in the case of forming images on a plurality of recording materials P, and a post-process (post-rotation process or post-print operation). The image forming process corresponds to a period in which to perform formation of an electrostatic latent image for an image to be actually formed on a recording material P to be output, formation of a toner image, primary transfer of the toner image, secondary transfer, and fixing, and the time of image formation refers to this period. In more detail, timing of the time of image formation differs depending on the positions for performing respective processes of charging, exposure, development, primary transfer, secondary transfer, and fixing. The pre-process corresponds to a period in which to perform a preparatory operation previous to the image forming process, from the time of receiving a start instruction to the time of beginning to actually form an image. The inter-sheet process corresponds to a period corresponding to an interval between a recording material P and a recording material P in serially performing image formation on a plurality of recording materials P (serial image formation). The post-rotation process corresponds to a period in which to perform an organizing operation (preparatory operation) subsequent to the image forming process. The time of non-image formation corresponds to a period other than the time of image formation, and includes, for example, the above-mentioned pre-process, inter-sheet process, and post-process and, additionally, a pre-multiple rotation process, which is a preparatory operation to be performed at the time of powering-on of the image forming apparatus 100 or at the time of returning from a sleep state. Moreover, in the exemplary embodiment 1, the image forming apparatus 100 is able to perform a toner supply operation described below. The toner supply operation, which is performed at timing different from that of the image forming operation, is an operation for supplying toner t from the developing roller 41 to the photosensitive member 1 and supplying toner t to the contact portion P6 between the cleaning blade 51 and the photosensitive member 1. Moreover, with regard to the toner supply operation, the image forming apparatus 100 is able to perform a first toner supply operation and a second toner supply operation based on a condition stored in a memory ml. While details of the first toner supply operation and the second toner supply operation are described below, the first toner supply operation is an operation which is performed mainly when the process cartridge 7 has been initially set in the image forming apparatus 100. Then, the second toner supply operation is a toner supply operation which is performed after the first toner supply operation is performed.

<Configuration of Photosensitive Member>

Next, the photosensitive member 1 in the exemplary embodiment 1 is further described in detail.

The photosensitive member 1 to be usable is the one configured by providing a photosensitive material, such as an organic photo-semiconductor (OPC), amorphous selenium, or amorphous silicon, on a cylindrical drum base serving as a supporting member made from, for example, aluminum or nickel. Additionally, the photosensitive member 1 can be provided with a wear-resistant protective layer as the outermost surface layer to improve wear resistance. Providing the protective layer enables improving the durability of the photosensitive member 1. In the exemplary embodiment 1, the photosensitive member 1 is an OPC photosensitive member, in which the photosensitive layer is configured with use of an organic photo-semiconductor. In the exemplary embodiment 1, the photosensitive member 1 includes a cylindrical metallic supporting member with an outer diameter of 24 mm having conductive property, a conductive layer serving as an undercoat layer for the supporting member, a photosensitive layer (charge generation layer and charge transport layer) formed on the undercoat layer, and a protective layer formed on the photosensitive layer.

It is favorable that the protective layer contains electroconductive particles and/or a charge transport substance and a resin. Examples of the electroconductive particles can include particles of metal oxides such as titanium oxide, zinc oxide, tin oxide, and indium oxide. Examples of the charge transport substance can include polycyclic aromatic compounds, heterocyclic compounds, hydrazone compounds, styryl compounds, enamine compounds, benzidine compounds, triarylamine compounds, and resins having groups derived from these substances. Among these, triarylamine compounds and benzidine compounds are favorable. Examples of the resin can include polyester resins, acrylic resins, phenoxy resins, polycarbonate resins, polystyrene resins, phenolic resins, melamine resins, and epoxy resins. Among these, polycarbonate resins, polyester resins, and acrylic resins are favorable.

Moreover, the protective layer can be formed as a cured film obtained by polymerizing a composition which contains a monomer having a polymerizable functional group. Examples of the reaction for this forming process can include a thermal polymerization reaction, a photopolymerization reaction, and a radiation polymerization reaction. Examples of the polymerizable functional group included in the monomer having a polymerizable functional group can include an acrylic group and a methacrylic group. As the monomer having the polymerizable functional group, a material having a charge transport property can be used.

Moreover, the protective layer can contain additives such as an antioxidant, an ultraviolet absorber, a plasticizer, a leveling agent, a lubrication imparting agent, and a wear resistance improver. Specific examples of the additives can include hindered phenol compounds, hindered amine compounds, sulfur compounds, phosphorus compounds, benzophenone compounds, siloxane-modified resins, silicone oil, fluororesin particles, polystyrene resin particles, polyethylene resin particles, silica particles, alumina particles, and boron nitride particles.

It is favorable that the average film thickness of the protective layer is 0.5 micrometers (μm) or more and 10 μm or less, and it is more favorable that the average film thickness of the protective layer is 1 μm or more and 7 μm or less. In the exemplary embodiment 1, the average film thickness of the protective layer is set to 3 μm.

The protective layer can be formed by preparing a protective layer-forming coating solution containing the above-mentioned materials and a solvent, forming a coating film of this coating solution, and drying and/or curing the coating film. Examples of the solvent used for the coating solution can include alcohol solvents, ketone solvents, ether solvents, sulfoxide solvents, ester solvents, and aromatic hydrocarbon solvents.

Moreover, in the exemplary embodiment 1, roughening treatment is performed on the surface of the photosensitive member 1. In a case where the photosensitive member 1 subjected to appropriate roughening treatment has been used, a metallic soap 45*c* is buried in grooves formed on the surface of the photosensitive member 1, so that the metallic soap 45*c* is able to continue remaining on the surface of the photosensitive member 1 without being removed. Therefore, the advantageous effect of a metallic soap coating operation further continues, so that it is possible to stably coat the metallic soap 45*c* onto the surface of the photosensitive member 1 over a long period.

To exert an advantageous effect such as mentioned above, when roughening treatment is applied to the surface of the photosensitive member 1, a photosensitive member 1 satisfying the following condition is used. The 10-point average roughness (Rz) of the peripheral surface of the photosensitive member 1 is $0<Rz\leq 70$ (m) (favorably, $0.10\leq Rz\leq 0.50$ (m)), and the mean spacing (Sm) of irregularities of the peripheral surface is $0<Sm\leq 70$ (m) (favorably, $5\leq Sm\leq 70$ (m)). Setting the above-mentioned ranges enables stably maintaining the metallic soap 45*c* on the surface of the photosensitive member 1, so that it is possible to prevent or reduce image deletion over a long period. Therefore, the exemplary embodiment 1 is characterized by performing roughening treatment for forming irregularities on the surface of the photosensitive member 1, thus maintaining the durability of the photosensitive member 1 even in a long service life configuration.

With regard to the photosensitive member 1 in the exemplary embodiment 1, to maintain the durability of the photosensitive member 1, roughening treatment for forming minute irregularities on the surface thereof is performed. According to Japanese Patent No. 4,027,407, on the peripheral surface of the photosensitive member 1, a plurality of grooves, the width of each of which extending in approximately the circumferential direction of the peripheral surface is within a range of 0.5 μm or more to 40 μm or less, is formed in such a way as to be arranged side by side in the longitudinal direction (generatrix direction or rotational axis direction of the photosensitive member 1).

Figure 4:
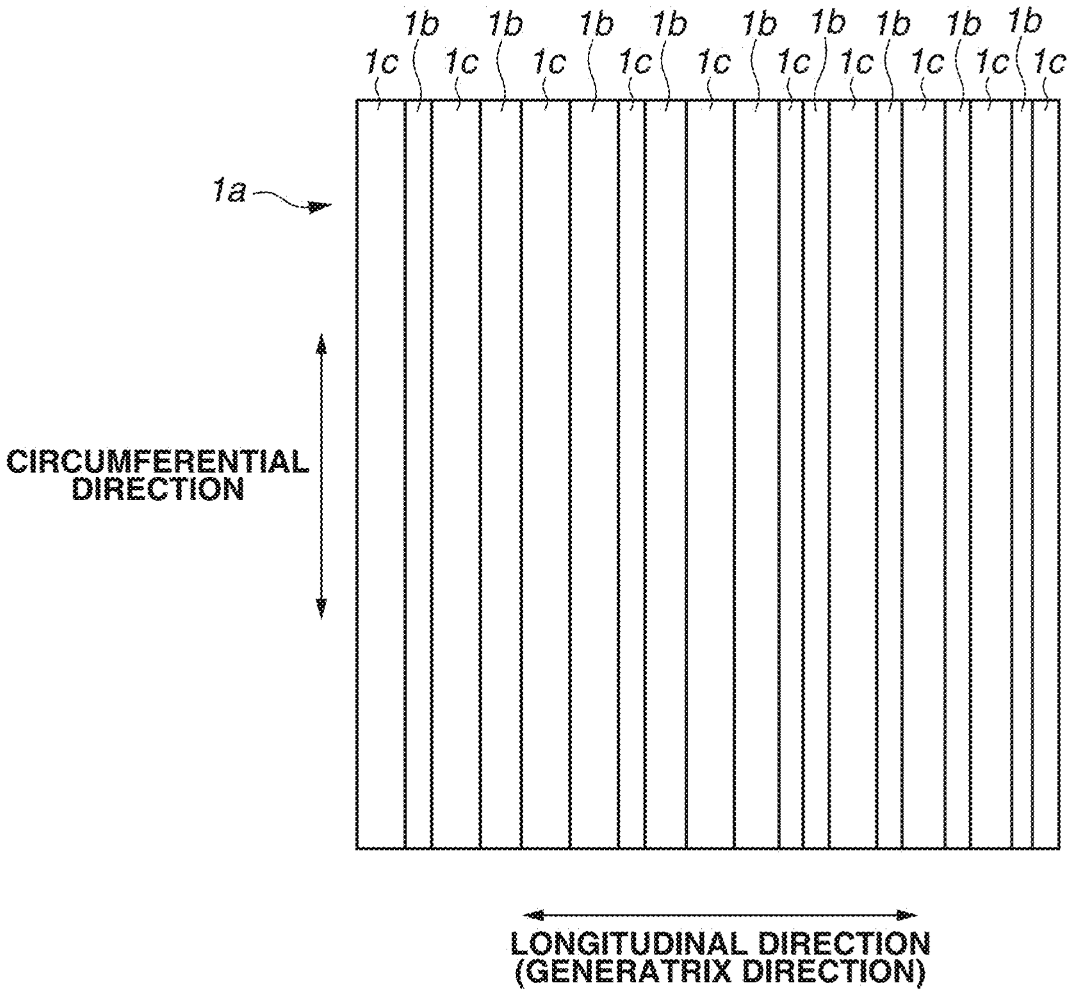
FIG. 4 is a diagram illustrating a surface obtained by performing roughening treatment on a photosensitive member in the exemplary embodiment 1.

FIG. 4 illustrates an example of the state of grooves 1*b* formed on the peripheral surface 1*a* of the photosensitive member 1. As illustrated in FIG. 4, the grooves 1*b*, each of which is a ring-shaped groove extending, on the peripheral surface 1*a* of the photosensitive member 1, in the circumferential direction thereof, are formed in such a way as to be arranged side by side while leaving a space between each other in the generatrix direction of the peripheral surface 1*a*. Thus, the peripheral surface 1*a* is made to have a configuration in which flat portions 1*c*, in which no groove 1*b* is formed, and the grooves 1*b* are formed alternately one after another in the generatrix direction. Furthermore, the area in which the grooves 1*b* are formed in the peripheral surface 1*a* may include an area with which the cleaning blade 51 comes into abutting contact, and does not necessarily need to be formed over the entire area in the longitudinal direction of the peripheral surface 1*a*.

Furthermore, as also discussed in the above-mentioned Japanese Patent No. 4,027,407, the groove 1*b* is not limited to having a configuration formed in such a way as to extend in the same direction as the circumferential direction as illustrated in FIG. 4. For example, the groove 1*b* can have a configuration formed in such a way as to have an angle of 10° relative to the circumferential direction. Moreover, the groove 1*b* can have a configuration formed in such a way as to have an angle of ±30 relative to the circumferential direction and in which the grooves 1*b* different in angle intersect with each other. In the exemplary embodiment 1, the term "approximately the circumferential direction" includes a case where the direction concerned is perfectly the circumferential direction and a case where the direction concerned is almost the circumferential direction, and the term "almost the circumferential direction" is, specifically, a direction of less than ±60° relative to the circumferential direction.

Figure 5:
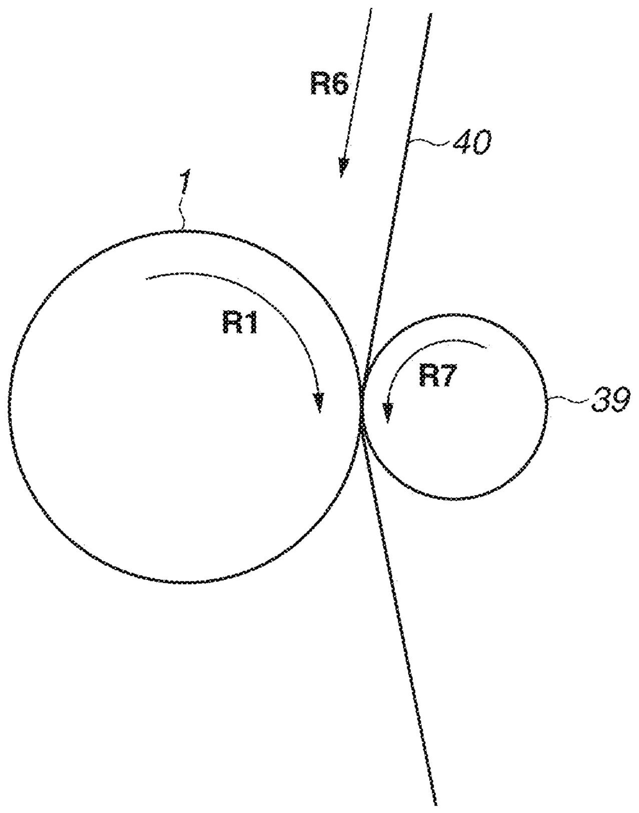
FIG. 5 is a schematic view of a roughening treatment device for the photosensitive member in the exemplary embodiment 1.

Next, a polishing method for polishing the surface of the photosensitive member 1 is described. FIG. 5 is a schematic view of a polishing device which polishes the surface of the photosensitive member 1. An abrasive sheet 40 is rewound in the direction of arrow R6 in FIG. 5 by a wind-up mechanism (not illustrated). The photosensitive member 1 rotates in the direction of arrow R1 in FIG. 5. A backup roller 39 rotates in the direction of arrow R7 in FIG. 5. With regard to a polishing condition, an abrasive sheet manufactured by Riken Corundum Co., Ltd. (product name: GC #3000, base layer sheet thickness: 75 m) was used as the abrasive sheet 40. Then, with use of an urethane roller with a hardness of 200 (outer diameter: 50 mm) as the backup roller 39, polishing was performed for 5 seconds to 30 seconds with the amount of penetration set to 2.5 mm, the amount of sheet feed set to 200 millimeters per second (mm/s) to 400 mm/s, and the feed direction of the abrasive sheet 40 and the rotational direction of the photosensitive member 1 set to the same. The surface roughness of the photosensitive member 1 after being subjected to polishing was measured under the following condition with use of a surface roughness measuring device (product name: SE700, SMB-9, manufactured by Kosaka Laboratory Ltd.). Measurement was performed at the positions of 30 mm, 110 mm, and 185 mm from the coating upper end in the longitudinal direction of the photosensitive member 1, and, after the photosensitive member 1 was rotated by 120° toward the near side, measurement was similarly performed at the positions of 30 mm, 110 mm, and 185 mm from the coating upper end. Additionally, after the photosensitive member 1 was rotated by 120° toward the near side, measurement was similarly performed, so that measurement at 9 points was performed. The measurement condition was set to the measurement length: 2.5 mm, the cutoff value: 0.8 mm, the feed speed: 0.1 mm/s, the filter characteristic: 2CR, and the leveling: straight line (entire area). While, in the exemplary embodiment 1, roughening treatment was performed on the surface of the photosensitive member 1, unless the circumstances are exceptional, roughening treatment does not need to be performed.

<Structure of Toner>

Next, a structure of toner t is further described in detail.

In the exemplary embodiment 1, as toner t, an inorganic particle externally-added toner obtained by externally adding inorganic silicon to base particles (toner particles) to ensure flowability and improve chargeability is used. The toner t used in the exemplary embodiment 1 is a non-magnetic one-component particulate polymerized toner, the charging polarity of which is a negative polarity and the average particle diameter of which is 7 km.

Figure 6:
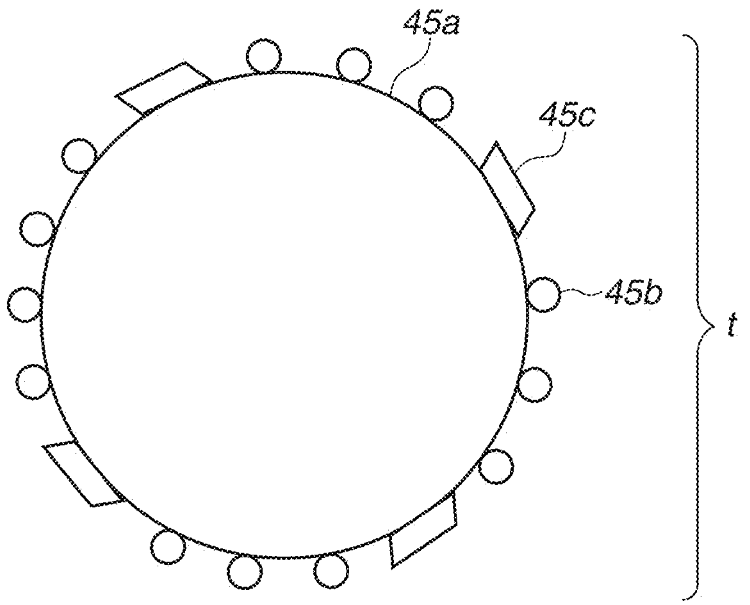
FIG. 6 is a schematic view of toner in the exemplary embodiment 1.

As illustrated in FIG. 6, additionally, with a view to reducing the friction coefficient of the surface of the photosensitive member 1, a metallic soap 45*c* is externally added in addition to the inorganic silicon 45*b*. While, originally, the electric discharge product is high in adhesiveness and increases the friction coefficient of the surface of the photosensitive member 1, supplying the metallic soap 45*c* to the surface of the photosensitive member 1 enables preventing and reducing the electric discharge product from adhering to the surface of the photosensitive member 1 and preventing or reducing an increase in friction coefficient.

The metallic soap 45*c* is a generic name for long-chain fatty acids and metallic salts other than those of sodium and potassium.

Specific examples thereof can include metallic salts between fatty acids, such as stearic acid, myristic acid, lauric acid, ricinoleic acid, and octylic acid, and metallic species such as lithium, magnesium, calcium, barium, and zinc. In the exemplary embodiment 1, zinc stearate is externally added as the metallic soap 45*c*. Furthermore, the type of the metallic soap 45*c* is not limited to this, but, for example, lead stearate, cadmium stearate, barium stearate, calcium stearate, aluminum stearate, zinc stearate, magnesium stearate, zinc laurate, and zinc myristate can be used as appropriate, and at least one type of them may be selected.

It is desirable that the external addition amount of the metallic soap 45c be 0.6 weight percent (wt %) or less. The larger the external addition amount, the higher the effect of preventing or reducing the adhesion of the electric discharge product to the photosensitive member 1, but excessive external addition lowers the flowability of the toner and decreases the image density of the latter half of the image. This is a phenomenon called "solid followability failure" in which, when a solid black image is output, the followability lowers as the image portion concerned comes closer to the trailing end of a recording material. On the other hand, it is desirable that the external addition amount of the metallic soap 45c be 0.05 wt % or more. If the external addition amount is smaller than 0.05 wt %, the advantageous effect of the metallic soap 45c becomes less likely to be exhibited.

It is favorable that the average particle diameter of the metallic soap 45c be 0.15 m or more and 2.0 μm or less. When the average particle diameter of the metallic soap 45c becomes less than 0.15 m, the metallic soap 45c becomes not readily applied onto the surface of the photosensitive member 1. This phenomenon is particularly conspicuous when there are grooves in the surface of the photosensitive member 1 described below. On the other hand, when the average particle diameter becomes larger than 2.0 m, the metallic soap 45c becomes unable to pass through, for example, the developing blade 43 in the developing device 4, is left behind inside the developing chamber 46a, and thus becomes less likely to be supplied to the surface of the photosensitive member 1. Hereinafter, a combination of the toner base particle 45a and the external additives (the inorganic silicon 45b and the metallic soap 45c) is referred to as "toner".

The method for measuring the average particle diameter of the metallic soap 45c is described. To 0.5 grams (g) of the metallic soap 45c, 10 milliliters (mL) of ethanol was added, and the resulting mixture was ultrasonically dispersed for 5 minutes with an ultrasonic disperser manufactured by Nippon Seiki Co., Ltd. Next, ethanol was circulated as the measurement solvent. Then, to a Microtrac laser diffraction/scattering particle size distribution analyzer (SPA type) manufactured by Nikkiso Co., Ltd., the obtained dispersion liquid of the metallic soap 45c was added until the value DV (diffracted light quantity) which related to the scattered light quantity integrated value of the particles reached 0.6 to 0.8. Then, the particle size distribution in this state was measured, and the median diameter obtained as the cumulative median diameter, in other words, the 50% diameter, was assumed to be the average particle diameter.

The metallic soap 45c having the above-mentioned average particle diameter can be produced by, for example, a double decomposition process which uses an aqueous solution of a fatty acid salt to react with an aqueous solution or a dispersion liquid of an inorganic metal salt.

In the exemplary embodiment 1, zinc stearate having an average particle diameter of 0.60 μm was used. Zinc stearate which served as the metallic soap 45c was caused to adhere to the toner particles by being electrically charged to a polarity opposite to that of the toner particles, and was supplied onto the photosensitive member 1 at the time of non-image formation.

Next, the method for producing the toner particles is described.

A known method can be used as the method for producing the toner particles, and a kneading and pulverizing method and a wet manufacturing method can be used. From the viewpoints of uniform particle diameter and shape controllability, the wet manufacturing method is favorable. Additionally, as the wet manufacturing method, for example, a suspension polymerization method, a dissolution suspension method, an emulsion polymerization aggregation method, and an emulsion aggregation method can be used.

In the exemplary embodiment 1, the suspension polymerization method was employed. In the suspension polymerization method, first, a polymerizable monomer composition is prepared by uniformly dissolving or dispersing a polymerizable monomer for generating a binder resin, and other additives, such as a coloring agent, as desired by using a dispersing machine such as a ball mill or an ultrasonic dispersing machine. This process is referred to as a process of preparing the polymerizable monomer composition. During this process, for example, a polyfunctional monomer, a chain transfer agent, wax serving as a parting agent, a charge control agent, and a plasticizer can be added as appropriate. Favorable examples of the polymerizable monomer used in the suspension polymerization method can include the following vinyl-based polymerizable monomers: styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octyl styrene, p-n-nonyl styrene, p-n-decylstyrene, p-n-dodecylstyrene, p-methoxystyrene, and p-phenylstyrene; acryl-based polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic-based polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl benzoate, vinyl butyrate, and vinyl formate; vinyl ethers such as vinyl methyl ether, vinyl ethyl ether, and vinyl isobutyl ether; and ketones such as vinyl methyl ketone, vinyl hexyl ketone, and vinyl isopropyl ketone.

Next, the above-mentioned polymerizable monomer composition is injected into an aqueous medium prepared in advance, and droplets formed of the polymerizable monomer composition are formed to have the desired toner particle size by using a stirrer or a dispersing machine which has a high shear force. This process is referred to as a particle forming process. It is favorable that the aqueous medium in the particle forming process contains a dispersion stabilizer with a view to controlling the particle sizes of the toner particles, yielding a sharp particle size distribution, and preventing or reducing coalescence of toner particles during the manufacturing process. In general, the dispersion stabilizer is roughly categorized into a polymer which exhibits a repelling force due to steric hindrance and a hardly water-soluble inorganic compound which stabilizes the dispersion by an electrostatic repelling force. The fine particles of the hardly water-soluble inorganic compound dissolve in acids and alkalis and, therefore, can be easily removed by washing with and dissolving in an acid or an alkali after the polymerization, thus being favorably used.

As the dispersion stabilizer for the hardly water-soluble inorganic compound, the one which contains any one of magnesium, calcium, barium, zinc, aluminum, and phosphorus is favorably used. It is more favorable that the dispersion stabilizer for the hardly water-soluble inorganic compound contains any one of magnesium, calcium, aluminum, and phosphorus.

Specific examples of the dispersion stabilizer are as follows:

magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite.

The above-mentioned dispersion stabilizer can be used in combination with an organic compound, for example, polyvinyl alcohol, gelatin, methyl cellulose, methyl hydroxypropyl cellulose, ethyl cellulose, carboxymethyl cellulose sodium salt, or starch. It is favorable that these dispersion stabilizers are used in an amount of 0.01 parts by mass or more and 2.00 parts by mass or less relative to 100 parts by mass of the polymerizable monomer.

Additionally, to make these dispersion stabilizers finer, 0.001 parts by mass or more and 0.1 parts by mass or less of a surfactant can be used in combination relative to 100 parts by mass of the polymerizable monomer. Specifically, commercially available nonionic, anionic, and cationic surfactants can be used. For example, sodium dodecyl sulfate, sodium tetradecyl sulfate, sodium pentadecyl sulfate, sodium octyl sulfate, sodium oleate, sodium laurate, potassium stearate, and calcium oleate can favorably be used.

After or during the particle forming process, the temperature can favorably be set to 50° C. or more and 90° C. or less to polymerize the polymerizable monomer contained in the polymerizable monomer composition, so that a toner particle dispersion liquid is obtained. This process is referred to as a polymerizing process. In the polymerizing process, stirring can favorably be performed to make the temperature distribution inside the reaction container uniform. In the case of adding a polymerization initiator, the addition can be carried out at an optional timing and in an optional time. Moreover, with a view to obtaining a desired molecular weight distribution, the temperature can be elevated in the latter half of the polymerization reaction, and, additionally, with a view to removing, for example, the unreacted polymerizable monomer and side products to outside the system, the aqueous medium can be partly distilled away by a distillation operation in the latter half of the reaction or after the end of the reaction. The distillation operation can be performed at normal pressure or under reduced pressure.

In general, an oil-soluble initiator is used as the polymerization initiator to be used in the suspension polymerization method. Specific examples of the oil-soluble initiator are as follows:

azo compounds such as 2,2'-azobisisobutyronitrile, 2,2'-azobis-2,4-dimethylvaleronitrile, 1,1'-azobis(cyclohexane-1-carbonitrile), and 2,2'-azobis-4-methoxy-2,4-dimethylvaleronitrile; and peroxide-based initiators such as acetylcyclohexylsulfonyl peroxide, diisopropylperoxycarbonate, decanonyl peroxide, lauroyl peroxide, stearoyl peroxide, propionyl peroxide, acetyl peroxide, tert-butyl peroxy-2-ethyl hexanoate, benzoyl peroxide, tert-butylperoxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

The polymerization initiator can be used in combination with a water-soluble initiator. Specific examples of the water-soluble initiator are as follows: ammonium persulfate, potassium persulfate, 2,2'-azobis(N,N'-dimethyleneisobutyroamizine) hydrochloride, 2,2'-azobis(2-aminodinopropane) hydrochloride, azobis(isobutylamizine)hydrochloride, sodium 2,2'-azobisisobutyronitrilesulfonate, ferrous sulfide, and hydrogen peroxide.

These polymerization initiators can be used alone or in combination, and, to control the degree of polymerization of the polymerizable monomer, for example, a chain transfer agent and a polymerization inhibitor can be further added and used.

Furthermore, the toner t can contain an organic silicon polymer in which the number of carbon atoms directly bonded to a silicon atom in the organic silicon polymer is 1 or more and 3 or less. Moreover, the organic silicon polymer can be the one having a partial structure represented by $R—SiO_{3/2}$. Here, R can represent a hydrocarbon group having 1 to 6 carbon atoms inclusive, or R can represent a hydrocarbon group having 1 to 3 carbon atoms inclusive.

The water washing migration amount of the inorganic silica was controlled by using a Henschel Mixer (manufactured by NIPPON COKE & ENGINEERING CO., LTD.) as a surface modifying device and by changing the external addition amount, the rotational speed (peripheral speed) of a free end of a blade, and the time (duration) for which the blade was being rotated, which were the external addition conditions. The external addition conditions of toner t in the exemplary embodiment 1 are shown in Table 1 below. Furthermore, the details of the surface modifying device and the peripheral speed and the time of the surface modifying device, which are the external addition conditions, are as discussed in Japanese Patent Application Laid-Open No. 2016-38591. Moreover, 0.20 wt % of zinc stearate was externally added to the toner t used in the exemplary embodiment 1.

TABLE 1

| | Inorganic silicon particles | | | | |
|---|---|---|---|---|---|
| | first-stage external addition condition | | | | |
| | silica amount [wt %] | device | peripheral speed [m/s] | time [sec] | second-stage external addition condition silica amount [wt %] |
| Toner t | 0.8 | surface modifying device | 40 | 300 | 0.8 |

| | Inorganic silicon particles second-stage external addition condition | | | Metallic soap | |
|---|---|---|---|---|---|
| | device | peripheral speed [m/s] | time [sec] | type | external addition amount [wt %] |
| Toner t | surface modifying device | 40 | 60 | zinc stearate | 0.2 |

<Structure of Lubricant>

As illustrated in FIG. 6, an inorganic particle externally-added toner t is used as a lubricant to be applied to the developing roller 41 at the time of shipment of process cartridges, and the average particle diameter thereof is set to 7 km. However, the type of the lubricant is not limited to the above-mentioned inorganic particle externally-added toner t, but can be, for example, silicone resin. Moreover, a lubricant does not need to be applied to the surface of the developing roller 41.

<Execution Criteria of Toner Supply Sequence and Outline Thereof>

In the exemplary embodiment 1, when a new-product process cartridge 7 has been set in the image forming apparatus 100, a toner supply sequence (toner purge operation) is performed. The outline of the toner supply sequence is described with reference to FIG. 7.

Figure 7:
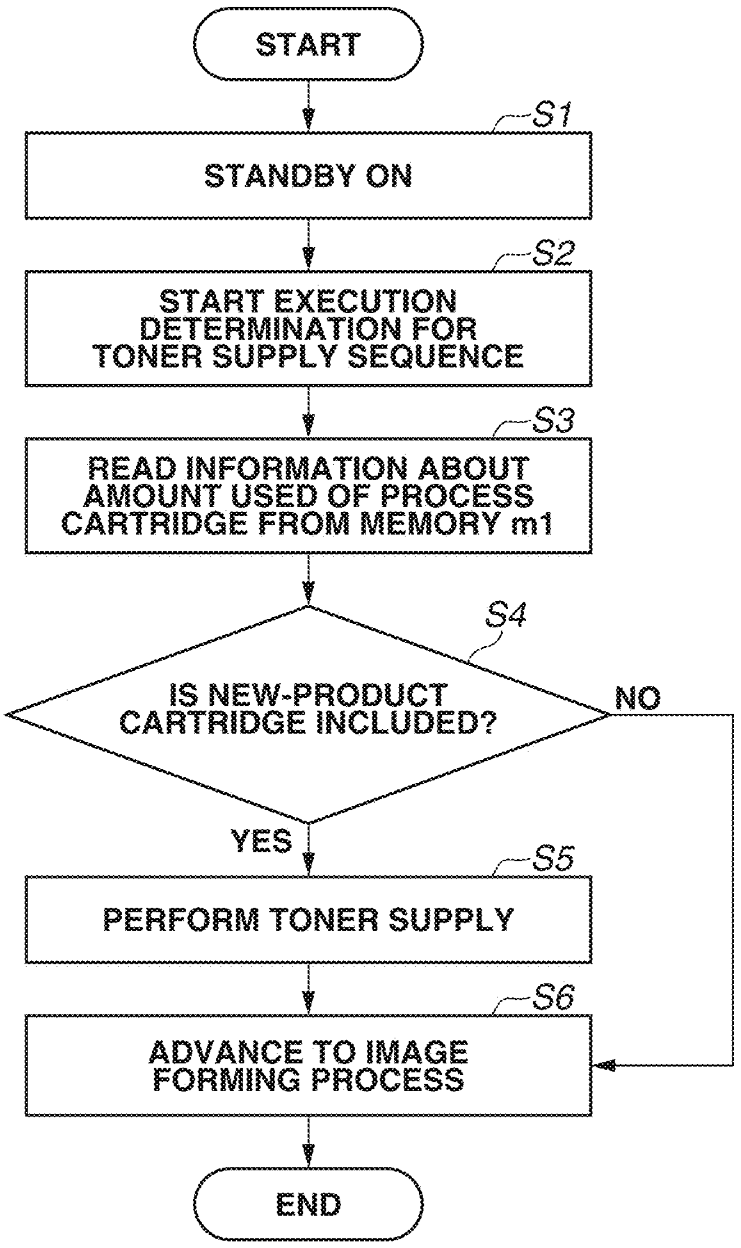
FIG. 7 is a flowchart in the exemplary embodiment 1.

FIG. 7 is a flowchart illustrating the operation of discharging toner present on the developing roller when the process cartridge 7 is a new product.

For example, when, in step S1, the image forming apparatus 100 comes into an operable (standby ON) state in response to the image forming apparatus 100 being powered on or a cartridge replacement panel being opened and closed, then in step S2, the control unit 202 starts an execution determination operation for the toner supply sequence.

First, in step S3, the control unit 202 performs communication with the memory ml mounted in the process cartridge 7 via a memory communication portion (not illustrated) and reads information about the amount used of the process cartridge 7. Here, the memory ml is arranged at the side of the photosensitive member unit 8, but can be arranged at the side of the developing device 4.

After that, in step S4, the control unit 202 determines whether a new-product cartridge is included based on the information about the amount used of the process cartridge 7.

If, in step S4, it is determined that no new-product cartridge is included (NO in step S4), then in step S6, the control unit 202 performs control not to perform the toner supply sequence and advances the processing to an image forming process.

If, in step S4, it is determined that a new-product cartridge is included (YES in step S4), then in step S5, the control unit 202 performs the toner supply sequence described below. After completing the execution of the toner supply sequence, then in step S6, the control unit 202 advances the processing to the image forming process.

At the initial stage of use of the process cartridge 7, since the friction coefficient of the surface of the photosensitive member 1 is high, it is desirable to actively supply the metallic soap 45*c* to the surface of the photosensitive member 1 as quickly as possible, thus reducing the frictional coefficient.

At the contact portion P6 where the photosensitive member 1 and the cleaning blade 51 are in contact with each other, a cleaning blocking layer made from an external additive is not yet sufficiently formed, so that the cleaning performance is also in an unstable state. Therefore, a special consideration is used in supplying toner to the surface of the photosensitive member 1 and sending toner to the contact portion P6. Particularly, it is known that, if the roughening treatment on the surface of the photosensitive member 1, which is employed in the exemplary embodiment 1, is performed, a blocking layer at the nip portion is less likely to be formed.

Therefore, in the exemplary embodiment 1, driving is started with a high-voltage condition and a driving condition used at the time of image formation in such a manner that an electric potential difference which is formed between the supply roller 42 and the developing roller 41 and which causes an electrostatic force leading from the supply roller 42 to the developing roller 41 to act on the metallic soap 45*c*. Then, laser irradiation is performed on the photosensitive member 1 and a fixed amount of toner is supplied thereto. The voltages to be applied to the respective members in the toner supply sequence are set in such a way as to become Vd=−500 V, Vdc=−350 V, and Vrs=−400 V.

Furthermore, while, in the exemplary embodiment 1, an example in which, with regard to timing for performing the toner supply sequence, the toner supply sequence is performed when the process cartridge 7 is a new product has been described, the exemplary embodiment 1 is not limited to this example. The toner supply sequence can be performed at timing when the user has optionally designated, timing when it has been determined that torque at the time of driving is high, or timing when image defect such as density unevenness or faulty cleaning has occurred.

<Details of Toner Supply Pattern in Toner Supply Sequence>

Here, discharge patterns of a toner image which is discharged to the photosensitive member 1 are described.

Figure 8:
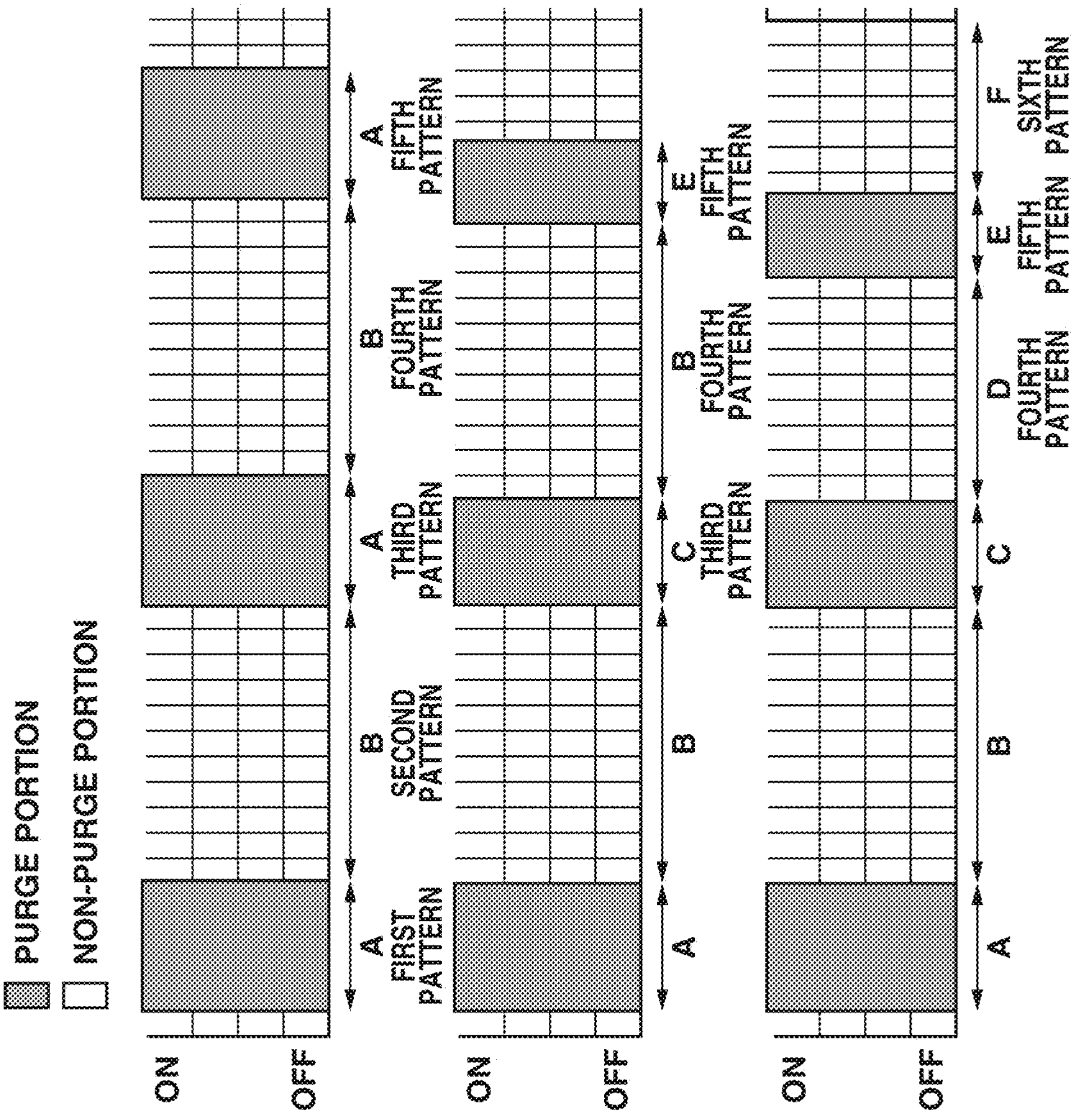
FIGS. 8A, 8B, and 8C are diagrams used to explain a toner supply pattern in exemplary embodiments 1 to 3.

FIGS. 8A, 8B, and 8C are timing charts obtained when the exposure device 3 has been controlled to form, with laser light, a toner supply pattern in the toner supply operation serving as the toner supply sequence.

At the time of initial setting of process cartridges, at the contact portion P6 where the photosensitive member 1 and the cleaning blade 51 are in contact with each other, a cleaning blocking layer made from, for example, an external additive is not yet sufficiently formed, so that the cleaning performance is in an unstable state. Therefore, it is not desirable to select a pattern for supplying a large amount of toner to the contact portion P6. Thus, it is desirable to control laser light in such a way as to obtain a discharge pattern for enabling supplying toner in small amounts to the surface of the photosensitive member 1 and supplying a sufficient amount of toner to form a blocking layer. Specifically, to appropriately form a cleaning clocking layer, an averaging rotation for a fixed interval after toner is supplied to the contact portion P6 becomes desirable. Therefore, the exemplary embodiment 1 is characterized by providing an average interval for discharging toner in small amounts and not discharging toner in a fixed interval. Additionally, in the exemplary embodiment 1, a repetitive operation of, after discharging toner in small amounts, providing an average interval for not discharging toner in a fixed interval becomes desirable. Therefore, as illustrated in FIG. 8A, with regard to patterns of a toner image to be formed on the surface of the photosensitive member 1, linear patterns homogeneous in the longitudinal direction are repeated a fixed number of times. These patterns are formed on the surface of the photosensitive member 1 and toner is supplied, so that toner is supplied in small amounts and in desired amounts. Furthermore, in the exemplary embodiment 1, the nip width of a nip which is formed at the contact portion P6 between the photosensitive member 1 and the cleaning blade 51 is 100 μm.

In the exemplary embodiment 1, there are a developing (purge) width A (a first pattern and a third pattern) in the rotational direction (circumferential direction) of the photosensitive member 1 and a non-developing (non-purge) width B (a second pattern and a fourth pattern) in the circumferential direction, in which development is not performed, so that toner is discharged in such a manner that the developing width A and the non-developing width B are repeated a plurality of times in a relationship of A<B. Here, the non-developing width B corresponds to the above-mentioned averaging interval. The control unit 202 performs control in such a way as to attain the developing width A=1 mm, the non-developing width B=9 mm, the number of times of repetition=5 times, and the amount of laser light=0.40 microjoule per square centimeter (J/cm$^2$). At this time, toner t to be developed on an exposure surface corresponding to the developing width A exposed with the amount of laser light=0.40 J/cm$^2$ formed on the surface of the photosensitive member 1 is in a state in which an amount of 0.40 milligrams per square centimeter (mg/cm$^2$) thereof is borne on the surface of the developing roller 41. From the developing roller 41 toward the photosensitive member 1, almost 100% of the toner t is developed on the above-mentioned exposure surface. Here, in the exemplary embodiment 1, the process speed (PS) of the toner supply operation is set to 91 mm/sec, which corresponds to a low-speed mode. Accordingly, the ratio of the circumferential speed of the developing roller 41 to the rotational speed of the photosensitive member 1 is 90%, so that 0.36 mg of toner is developed per square centimeter (cm$^2$). Moreover, in the exemplary embodiment 1, the developing aperture width in the rotational axis direction of the developing roller 41 (the maximum width with which to allow the toner t to be supplied to the surface of the developing roller 41) is set to 220 mm. The maximum width with which to allow exposure to be performed by the exposure device 3 is set to a width for allowing exposure to be performed on up to a region outside the above-mentioned width of 220 mm. In the exemplary embodiment 1, the first pattern corresponding to the developing width A is formed with longitudinal uniformity. This enables supplying toner to the contact portion P6 between the photosensitive member 1 and the cleaning device 51 in a longitudinally homogenous manner. A configuration in which the above-mentioned patterns are formed in a part of the longitudinal length can also be naturally employed.

Figure 9:
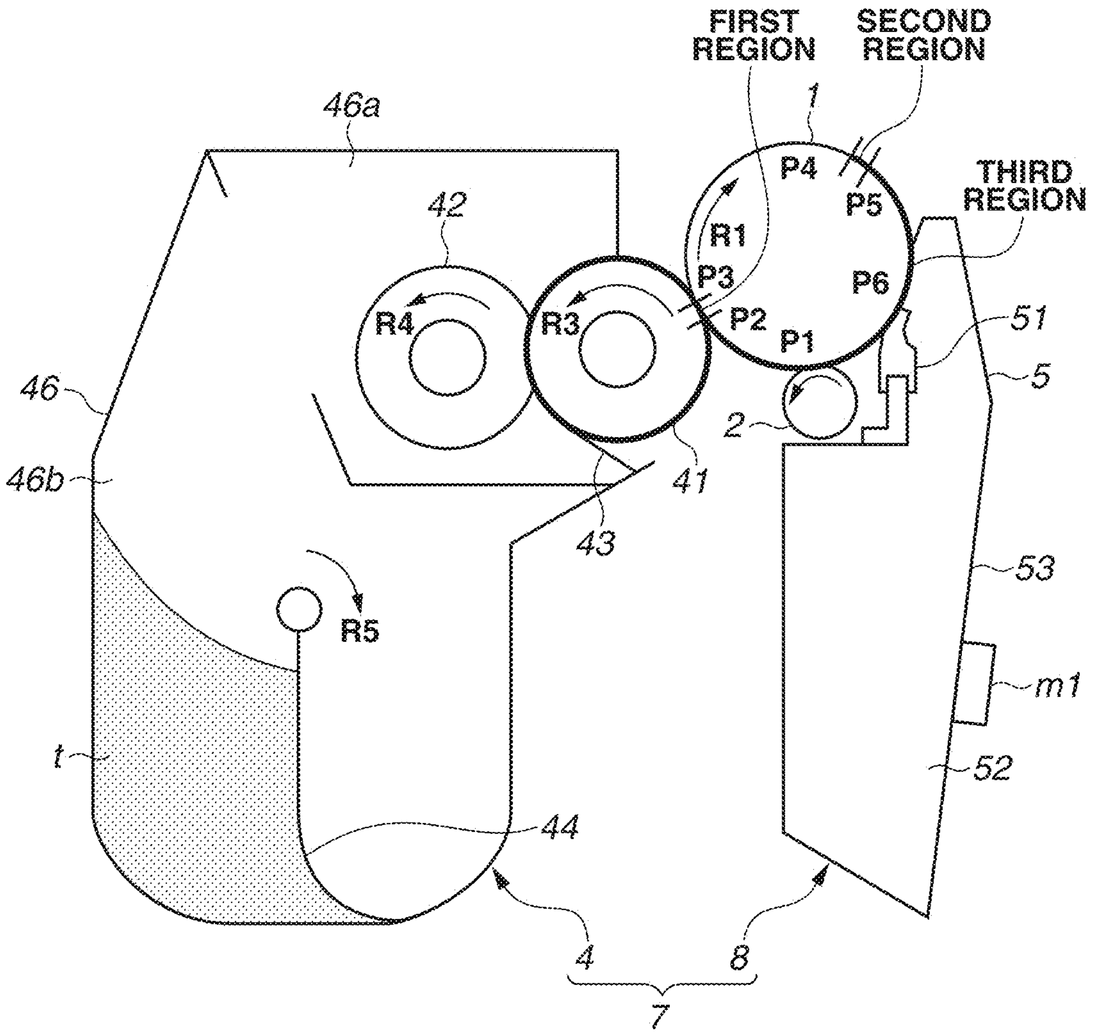
FIG. 9 is a diagram used to define regions of the surface of the photosensitive member in the exemplary embodiment 1.

A region of the photosensitive member 1 facing the developing roller 41 at the developing portion P3 in a state in which the photosensitive member 1 and the developing roller 41 are rotating is defined as a first region. A region of the photosensitive member 1 facing the developing roller 41 at the developing portion P3 after a region of the developing roller 41 facing the first region makes one revolution on the developing roller 41 is defined as a second region. Then, a region of the photosensitive member 1 between the first region and the second region in the rotational direction of the photosensitive member 1 is defined as a third region. FIG. 9 illustrates the definitions of the respective regions.

Details of the toner supply pattern which is used to perform the toner supply operation are described below.

In the third region, i.e., a region of the photosensitive member 1 corresponding to one turn of the developing roller 41, the following first pattern, second pattern, third pattern, and fourth pattern are formed. Thus, in a region of the photosensitive member 1 corresponding to "12 (the outer diameter φ of the developing roller 41)×π×(1/(90/100)) =41.9 mm (90 being the ratio of the circumferential speed of the developing roller 41 to the rotational speed of the photosensitive member 1), the following first pattern, second pattern, third pattern, and fourth pattern are formed.

In the exemplary embodiment 1, since the outer diameter P of the photosensitive member 1 is 24, "24×π=75.4 mm" is the outer circumferential length of the photosensitive member 1. The length of 41.9 mm corresponding to one turn of the developing roller 41 is equivalent to about 55% of one turn of the photosensitive member 1. The developing width A being a pattern for performing exposure on a part by the exposure device 3 is set as the first pattern. The non-developing width B being a pattern for not performing exposure after the first pattern in the rotational direction is set as the second pattern. The second round of developing width A being a pattern for performing exposure on a part by the exposure device 3 after the second pattern in the rotational direction is set as the third pattern. The second round of non-developing width B being a pattern for not performing exposure after the third pattern in the rotational direction is set as the fourth pattern. The control unit 202 performs control to form a toner supply pattern which includes the first pattern, the second pattern, the third pattern, and the fourth pattern. Here, the toner supply pattern is configured in such a manner that the length of the second pattern is larger than the length of the first pattern in the rotational direction. Moreover, the toner supply pattern is configured in such a manner that the length of the fourth pattern is larger than the length of the third pattern in the rotational direction. Particularly, in the exemplary embodiment 1, the toner supply pattern is configured in such a manner that the first pattern and the second pattern are repetitively formed. Thus, the first pattern and the third pattern are the same pattern, and the second pattern and the fourth pattern are the same pattern.

Each of the second pattern and the fourth pattern can be configured to form a non-developing portion by, instead of not performing exposure, performing exposure with an exposure amount smaller than an exposure amount used for exposure in the first pattern. Moreover, as long as the toner supply interval and the averaging interval are configured as in the above-mentioned condition, the form of, instead of forming the toner supply interval by exposure, developing toner with respect to the surface potential Vd of the photosensitive member 1 formed by the charging roller 2 can be employed. Specifically, the control unit 202 sets the developing voltage in such a way as to become larger in absolute value with respect to the surface potential Vd. Then, an electric potential difference by which toner t being charged to the negative polarity moves from the surface of the developing roller 41 to which the developing voltage has been applied to the surface of the photosensitive member 1 on which the surface potential Vd has been formed is formed between the developing roller 41 and the photosensitive member 1.

Furthermore, in the exemplary embodiment 1, an inorganic particle externally-added toner t is borne as a lubricant on the surface of the developing roller 41. Moreover, as a condition for performing the toner supply operation, the toner supply operation is controlled to be performed in a case where it is determined that the process cartridge 7 is a new product by the control unit 202 reading information about the amount used of the process cartridge 7. Accordingly, when the process cartridge 7 is initially set in the image forming apparatus 100, it is desirable to prevent the photosensitive member 1 and the cleaning blade 51 from continuing rotating while being in abutting contact with each other in a state in which torque is high. Therefore, it is preferable to promptly and effectively send the above-mentioned lubricant to the contact portion P6 between the photosensitive member 1 and the cleaning blade 51. Therefore, during one turn of the developing roller 41, at the very least, it may be preferable to perform the toner supply operation, and, in the exemplary embodiment 1, the toner supply operation is set in such a manner that a part of the above-mentioned toner supply pattern is included within a region corresponding to the third region.

Moreover, in the exemplary embodiment 1, in a case where the process cartridge 7 is not in a beginning-of-use state, the control unit 202 performs control to perform a second toner supply operation different from a first toner supply operation which is the above-mentioned toner supply operation. The second toner supply operation is performed using a second toner supply pattern different from a first toner supply pattern which is the above-mentioned toner supply pattern. In the second toner supply operation, the developing width A which is formed on the surface of the photosensitive member 1 is 12.6 mm. It is favorable that the developing width A in the second toner supply operation is of the order of 10 mm to 20 mm. The toner supply pattern in the second toner supply operation is not a repetitive pattern but an operation which is completed with one round of supply.

The first toner supply operation includes, in the initial stage of use of the process cartridge, repeating toner supply and averaging to bring about a lubricating action at the contact portion P6 between the photosensitive member 1 and the cleaning blade 51. Then, the first toner supply operation includes performing control to set the amount of toner for supply at one time to the minimum amount, prevent the occurrence of faulty cleaning, and form a blocking layer. On the other hand, the second toner supply operation is an operation which is performed in a state in which there has been some progress made in the use of the process cartridge. The second toner supply operation is performed, as an example, at the time of a post-rotation operation after an image forming operation or at the time of an inter-sheet operation between an image forming operation and a next image forming operation in a case where the image forming operation has been sequentially performed. Here, in a phase in which the second toner supply operation is performed, a blocking layer made from toner or an external additive is formed at the contact portion P6 between the photosensitive member 1 and the cleaning blade 51. The second toner supply operation is performed to retain the blocking layer and, therefore, includes supplying a larger amount of toner than that in the first toner supply operation. Thus, the amount of toner which is supplied to the contact portion P6 by the first toner supply pattern and which corresponds to the first toner supply pattern formed on the surface of the photosensitive member 1 is made smaller than the amount of toner which is supplied to the contact portion P6 by the second toner supply pattern formed on the surface of the photosensitive member 1.

This means making the amount of toner in one supply for the second toner supply operation larger than that for the first toner supply operation. Additionally, the amount of toner which is supplied to the contact portion P6 by the first toner supply pattern is made smaller than the amount of toner which is supplied to the contact portion P6 by the second toner supply pattern formed on the surface of the photosensitive member 1. This means making the whole amount of toner which is supplied as one toner purge operation for the second toner supply operation larger than that for the first toner supply operation. Setting the condition as mentioned above enables using different toner supply operations as appropriate depending on situations.

Additionally, in the case of performing the first toner supply operation, the control unit 202 performs control to rotate the photosensitive member 1 at a first rotational speed, and, in the case of performing the second toner supply operation, the control unit 202 performs control to rotate the photosensitive member 1 at a second rotational speed higher than the first rotational speed. Relatively lowering the speed of the first toner supply operation aims at improving the followability of the cleaning blade 51 to the photosensitive member 1 and decreasing the amount of supply per unit time for supplying of toner. Thus, this means, by reducing the kinetic momentum of toner, creating a condition in which it is easy to perform cleaning by the cleaning blade 51. In the exemplary embodiment 1, the rotational speed of the photosensitive member 1 at the time of the second toner supply operation is set to 321 mm/sec, which is the speed in the normal mode. On the other hand, the rotational speed of the photosensitive member 1 at the time of the first toner supply operation is set to 91 mm/sec for a low-speed mode, in which the rotational speed of the photosensitive member 1 is lower than in the normal mode.

Additionally, in the exemplary embodiment 1, the intermediate transfer belt 31 is made able to come into abutting contact with and separate from each of the photosensitive members 1 by the belt contact and separation mechanism 90 (FIG. 3). In the exemplary embodiment 1, the belt contact and separation mechanism 90 is configured to move the primary transfer roller 32 in a direction to move away from the photosensitive member 1, thus causing the intermediate transfer belt 31 to separate from the photosensitive member 1. Moreover, the belt contact and separation mechanism 90 is configured to move the primary transfer roller 32 in a direction to come close to the photosensitive member 1, thus causing the intermediate transfer belt 31 to come into abutting contact with the photosensitive member 1. In the case of performing the first toner supply operation, the control unit 202 performs control to perform that operation in the state of causing the intermediate transfer belt 31 to be in contact with the photosensitive member 1, and, in the case of performing the second toner supply operation, the control unit 202 performs control to perform that operation in the state of causing the intermediate transfer belt 31 to be separate from the photosensitive member 1. Moreover, in the case of performing the first toner supply operation, the control unit 202 controls the transfer voltage in the following way. The control unit 202 makes the transfer voltage which is to be applied to the primary transfer roller 32 in the first toner supply operation smaller than the absolute value of the transfer voltage which is to be applied in the image forming operation. Then, the control unit 202 makes the transfer constant, which is an electric potential difference between the transfer voltage and the surface potential of the photosensitive member 1 in the primary transfer portion P4, smaller than the transfer contrast for the time of the image forming operation. In the following description, the reason for the above-mentioned control concerning transfer is described.

The case of the performing the first toner supply operation corresponds to, mainly, the initial stage of use of the process cartridge 7 as mentioned above. In that case, contact between the photosensitive member 1 and the cleaning blade 51 is in the state of being very unstable. Such instability brings about a state in which the runout of the photosensitive member 1 may be likely to occur or faulty cleaning, which occurs due to the abutting contact state of the cleaning blade 51 being unstable, may be likely to occur. Therefore, in the exemplary embodiment 1, at the time of the first toner supply operation, the control unit 202 moves the primary transfer roller 32 in a direction to come close to the photosensitive member 1, thus bringing the intermediate transfer belt 31 into abutting contact with the photosensitive member 1. Then, the result of the intermediate transfer belt 31 and the photosensitive member 1 being in abutting contact with each other leads to stabilizing the rotation of the photosensitive member 1 and acts in the direction of preventing or reducing the above-mentioned instability. Moreover, since, at the time of the first toner supply operation, the control unit 202 rotates the photosensitive member 1 while bring the intermediate transfer belt 31 into contact with the photosensitive member 1, toner t which has moved from the developing roller 41 to the surface of the photosensitive member 1 subjected to development passes through the primary transfer portion P4. The control unit 202 apples, at the primary transfer portion P4, such a transfer voltage as to make a lubricant containing toner t (in the exemplary embodiment 1, inorganic particle externally-added toner t) unlikely to be transferred to the intermediate transfer belt 31 whenever possible. In the exemplary embodiment 1, the control unit 202 applies a transfer voltage with a polarity opposite to the regular polarity of toner to the primary transfer roller 32. The control unit 202 makes such a transfer voltage larger toward the regular polarity side, which is based on the polarity opposite to the regular polarity of toner, i.e., toward the negative polarity side, than the transfer voltage in the image forming operation. Alternatively, the control unit 202 can turn off the transfer voltage or, in the first place, can apply a voltage with the same polarity as the regular polarity of toner. This causes an electric field which makes toner t more unlikely to move to the side of the intermediate transfer belt 31 than in the image forming operation to be formed at the primary transfer portion P4, and enables supplying a lubricant containing toner t to the contact portion P6 between the photosensitive member 1 and the cleaning blade 51.

In this way, setting a condition for performing a toner supply operation enables reducing the amount of toner per unit time which penetrates the contact portion P6 between the photosensitive member 1 and the cleaning blade 51 and maintaining cleanability while supplying a component serving as a cleaning blocking layer.

<Verification of Advantageous Effect>

In the above-described exemplary embodiment 1, a comparative verification between the exemplary embodiment 1 and comparative examples was performed by finding the amount of toner having adhered to the charging roller 2 after the toner supply sequence for the time of a new-product process cartridge was performed. The verification was performed with use of a cartridge filled with 400 grams (g) of toner under the condition of a low-temperature and low-humidity condition (temperature of 15° C. and humidity of 10%) in which faulty cleaning was likely to occur.

The toner supply pattern was set in the following way.

A comparative example 1 was set to the purge width A (first pattern)=5 mm, the non-purge width (second pattern) =0 mm, and the number of times of repetition=1 time. The comparative example 1 corresponded to control in which the first pattern was shortened in length with respect to the above-mentioned second toner supply operation.

A comparative example 2 was set to the purge width A (first pattern)=1 mm, the non-purge width (second pattern) =1 mm, and the number of times of repetition=5 times.

An exemplary embodiment 1-1 was set to the purge width A (first pattern)=1 mm, the non-purge width (second pattern) =9 mm, and the number of times of repetition=5 times.

An exemplary embodiment 1-2 was set to the purge width A (first pattern)=2.5 mm, the non-purge width (second pattern)=9 mm, and the number of times of repetition=2 times.

In all of these cases, the amount of toner supply to be used for comparison was set identical (5 mm).

<Verification Result>

Table 2 shows a verification result.

TABLE 2

| | Length in circumferential direction | | Number | Amount of |
|---|---|---|---|---|
| | Purge portion | Non-purge portion | of times | toner adhering to charging roller |
| Comparative example 1 | 5 mm | 0 mm | 1 time | large |
| Comparative example 2 | 1 mm | 1 mm | 5 times | medium |
| Exemplary embodiment 1-1 | 1 mm | 9 mm | 5 times | none |
| Exemplary embodiment 1-2 | 2.5 mm | 9 mm | 2 times | small (no problem in terms of image) |

In the comparative example 1, upon checking the charging roller 2 after ending of the toner supply sequence, toner t adhered thereto in large amounts, and, due to charging failure caused by charging roller smudge, a great number of vertical streaks appeared disadvantageously. In the comparative example 2, although they are minor than those in the comparative example 1, toner t adhered to the charging roller 2, and due to charging failure caused by charging roller smudge, a great number of vertical streaks appeared disadvantageously.

On the other hand, in the exemplary embodiment 1-1 and the exemplary embodiment 1-2, image defect did not occur. The reason why the advantageous effect was exerted in the configurations of the exemplary embodiment 1-1 and the exemplary embodiment 1-2 is considered as follows.

As a condition for performing a toner supply operation, a condition of promptly and effectively the above-mentioned lubricant to the contact portion P6 between the photosensitive member 1 and the cleaning blade 51 is desirable. Therefore, in the exemplary embodiment 1, a toner supply pattern is formed at least within a region corresponding to the third region. The length of the second pattern, which is a non-purge portion, is configured to be larger than the length of the first pattern, which is a purge portion, in the rotational direction, and the first pattern and the second pattern are configured to be repetitively formed.

First, in the exemplary embodiment 1-1, the first pattern A is set to 1 mm, and the second pattern B is set to 9 mm. In the exemplary embodiment 1, it is favorable that the first pattern A is set to less than 50% of the second pattern B, and it is more favorable that the ratio of the second pattern B to the toner supply pattern is set to greater than or equal to 70%. Thus, it is favorable to satisfy "A<B" and "(B/(A+B))×100≥70%".

Here, the ratio of the second pattern B to the toner supply pattern such as 70% is referred to as an "averaging ratio". It is meant that, the loner the averaging ratio, the longer the time to be averaged is. Since the averaging ratio in the exemplary embodiment 1-1 is 90%, it is understood that the averaging effect is sufficiently obtained. On the other hand, the averaging ratio in the comparative example 1 is 0%, and the averaging ratio in the comparative example 2 is 50%. From the viewpoint of the magnitude of the averaging ratio, while the level in the comparative example 2 is better than that in the comparative example 1, it follows that both are insufficient.

Moreover, even the length of the first pattern A has an optimal range, and, in the exemplary embodiment 1, it is favorable that the length of the first pattern A falls within a range of 0.5 mm to 3.0 mm. In the exemplary embodiment 1, a nip width in the rotational direction of the photosensitive member 1 which is formed at the contact portion P6 between the photosensitive member 1 and the cleaning blade 51 is 100 m, and the amount of application of toner t borne on the developing roller 41 is 0.40 mg/cm$^2$. Here, the developing width A serving as the first pattern is assumed to be set to 1 mm, and the ratio of the circumferential speed of the developing roller 41 to the rotational speed of the photosensitive member 1 in the first toner supply operation is 90%. Accordingly, in a case where a toner purge operation has been performed for a portion corresponding to 1 mm, the amount of toner which penetrates the nip portion becomes 0.036 mg/(1 mm×1 cm). In the configuration of the exemplary embodiment 1, it is experimentally known that the amount of toner which is allowable by one toner supply at the nip portion per unit nip (per 1 cm of the longitudinal width) is about 0.11 mg, and this corresponds to the developing width A of about 3.0 mm. Therefore, in the comparative example 1, since the developing width A is 5 mm, it can be said that the level of the amount of adhering toner was bad. Moreover, since, even when the amount of toner which is suppled at one time is too small, there is a case where the time of the toner supply operation becomes longer or, in the first place, the advantageous effect is not obtainable, a suitable range associated with the configuration should been regulated. Furthermore, although described below in the exemplary embodiment 2 or subsequent exemplary embodiments, once a blocking layer begins to be formed at a nip portion, the above-mentioned allowable amount of toner has a tendency to increase.

In the exemplary embodiment 1-2, although some toner adhesion was found compared with the exemplary embodiment 1-1, the level thereof did not have any problem in terms of image quality. This is also because, from the same reason as in the exemplary embodiment 1-1, "A<B" and "(B/(A+B))×100≥70%" are satisfied. Since the averaging ratio in the exemplary embodiment 1-2 is 78%, it is found that the advantageous effect is obtained.

From the present verification, as mentioned above, it was found that by, instead of supplying a large amount of toner at one time, appropriately supplying toner in small amounts, it was possible to supply toner serving as a cleaning blocking layer at low load. As in the exemplary embodiment 1, performing averaging rotation for a fixed interval after execution of toner supply enables supplying toner serving as a cleaning blocking layer to the contact portion P6 between the photosensitive member 1 and the cleaning blade 51 at low load.

In the exemplary embodiment 1, the following configuration is employed.

The image forming apparatus 100 includes the photosensitive member 1, which serves as a rotatable image bearing member, and the exposure device 3, which serves as an exposure unit configured to form an electrostatic latent image on the surface of the photosensitive member 1 by exposing the surface of the photosensitive member 1. The image forming apparatus 100 includes the developing roller 41, which serves a rotatable developer bearing member configured to, at a developing portion P3, supply toner to the surface of the photosensitive member 1 and develop the electrostatic latent image as a toner image. The image forming apparatus 100 includes the cleaning blade 51, which serves as a cleaning member configured to form a contact portion P6 by coming into contact with the photosensitive member 1 and, at the contact portion P6, remove toner adhering to the surface of the photosensitive member 1. The image forming apparatus 100 includes the control unit 202, which controls the following operations by causing the photosensitive member 1 and the developing roller 41 to rotate and controlling the exposure device 3. The control unit 202 performs control to enable performing (i) an image forming operation which forms a toner image on a recording material, and (ii) a toner supply operation which is an operation different from the image forming operation and which supplies the toner to the contact portion P6 by moving the toner from the developing roller 41 to the photosensitive member 1. A region of the photosensitive member 1 facing the developing roller 41 at the developing portion P3 in a state in which the photosensitive member 1 and the developing roller 41 are rotating is defined as a first region. Then, a region of the photosensitive member 1 facing the developing roller 41 at the developing portion P3 after a region of the developing roller 41 facing the first region makes one revolution is defined as a second region. Additionally, a region of the photosensitive member 1 between the first region and the second region in a rotational direction of the photosensitive member 1 is defined as a third region. When the toner supply operation is performed, the control unit 202 performs control to form the following pattern in the third region. The control unit 202 performs control to form a toner supply pattern which includes a first pattern for exposing a part of the surface of the photosensitive member 1 by the exposure device 3 and a second pattern for not exposing a part of the surface of the photosensitive member 1 or for exposing a part of the surface of the photosensitive member 1 with an exposure amount smaller than an exposure amount with which the first pattern is used for exposure. The toner supply pattern is configured in such a manner that the length of the second pattern is larger than the length of the first pattern in the rotational direction and that the first pattern and the second pattern are repetitively formed.

Moreover, the length of the third pattern in the rotational direction is smaller than the length of the first pattern in the rotational direction.

Additionally, the image forming apparatus 100 includes the memory ml, which stores information about a status of use of toner, and the control unit 202 performs control to perform the toner supply operation using the toner supply pattern based on information stored in the memory ml. The information is information for determining whether the toner is in a beginning-of-use state, and, in a case where the toner is in the beginning-of-use state, the control unit 202 performs control to perform the toner supply operation using the toner supply pattern. In a case where the toner is not in the beginning-of-use state, the control unit 202 performs control to perform a second toner supply operation different from a first toner supply operation, which is the toner supply operation using the toner supply pattern. The second toner supply operation is performed using a second toner supply pattern different from a first toner supply pattern which is the toner supply pattern. An amount of toner corresponding to a first pattern formed on the surface of the photosensitive member 1, which is supplied to the contact portion P6 by the first toner supply pattern, is smaller than an amount of toner which is supplied to the contact portion P6 by the second toner supply pattern formed on the surface of the photosensitive member 1. An amount of toner which is supplied to the contact portion P6 by the first toner supply pattern formed on the surface of the photosensitive member 1 is smaller than an amount of toner which is supplied to the contact portion P6 by the second toner supply pattern formed on the surface of the photosensitive member 1. A length in a rotational axis direction of the photosensitive member 1 of the first pattern is a length available for image formation in the image forming operation. The first pattern is uniformly formed in the rotational axis direction of the photosensitive member 1.

The image forming apparatus 100 includes the intermediate transfer belt 31, which forms the primary transfer portion P4 by coming into contact with the photosensitive member 1 and transfers a toner image formed on the surface of the photosensitive member 1 at the primary transfer portion P4 to a recording material P. The image forming apparatus 100 further includes the belt contact and separation mechanism 90, which serves as a contact and separation mechanism capable of performing a contact operation for causing the intermediate transfer belt 31 to come into contact with the photosensitive member 1 and a separation operation for causing the intermediate transfer belt 31 to separate from the photosensitive member 1. When performing the first toner supply operation, the control unit 202 performs control to perform the first toner supply operation while causing the intermediate transfer belt 31 to be in a state of being in contact with the photosensitive member 1. Then, when performing the second toner supply operation, the control unit 202 performs control to perform the second toner supply operation while causing the intermediate transfer belt 31 to be in a state of being separate from the photosensitive member 1. The image forming apparatus 100 further includes the primary transfer power source 73, which is a transfer voltage application portion configured to apply a transfer voltage to the intermediate transfer belt 31, i.e., the primary transfer roller 32. An electric potential difference which is formed between the transfer voltage and a surface potential formed on the surface of the photosensitive member 1 in the primary transfer portion P4 is defined as a transfer contrast. The control unit 202 performs control to make the transfer contrast of the first toner supply operation smaller than the transfer contrast of the image forming operation. The control unit 202 performs control to make an absolute value of the transfer voltage of the first toner supply operation smaller than an absolute value of the transfer voltage of the image forming operation or to turn off the transfer voltage. The control unit 202 can perform control to apply the transfer voltage with a polarity opposite to a polarity of the transfer voltage of the image forming operation in the first toner supply operation. When performing the first toner supply operation, the control unit 202 performs control to rotate the photosensitive member 1 at a first rotational speed, and, when performing the second toner supply operation, the control unit 202 performs control to rotate the photosensitive member 1 at a second rotational speed higher than the first rotational speed.

With the above-described configuration employed, it is possible to prevent or reduce the occurrence of an adverse effect in images resulting from faulty cleaning.

Next, other exemplary embodiments of the present disclosure are described. The basic configuration and operation of an image forming apparatus according to each of the other exemplary embodiments are almost similar to those of the image forming apparatus in the exemplary embodiment 1. Accordingly, in the image forming apparatus according to each of the other exemplary embodiments, elements identical to or corresponding to those of the image forming apparatus in the exemplary embodiment 1 are assigned the respective same reference characters as those in the exemplary embodiment 1, and the detailed description thereof is omitted.

Outlines of Other Exemplary Embodiments

An exemplary embodiment 2 is characterized by changing a toner supply pattern in a configuration similar to that in the exemplary embodiment 1.

Specifically, as illustrated in FIG. 8B, while a non-purge width B is fixed, a purge width A is made smaller as the next time advances. Thus, it is set that, at the first time, there are a purge width A in the circumferential direction subjected to development and a non-purge width B in the circumferential direction not subjected to development, at the second time, there are a purge width C in the circumferential direction subjected to development and a non-purge width B in the circumferential direction not subjected to development, and, at the third time, there are a purge width E in the circumferential direction subjected to development and a non-purge width B in the circumferential direction not subjected to development. In generalized words, toner t is progressively discharged in such a manner that the relationship between a purge width in the circumferential direction subjected to development at the n-th time and a purge width in the circumferential direction subjected to development at the (n+1)-th time becomes "n>n+1". A comparison with the comparative example 2, which has been used for comparison in the exemplary embodiment 1, is made.

The toner supply pattern in the exemplary embodiment 2 is as described below.

The exemplary embodiment 2 was set to the purge width A=2.5 mm/1.5 mm/1 mm, the non-purge width B=9 mm, and the number of times of repetition=3 times.

In both cases, the amount of toner supply to be used for comparison was set identical (5 mm).

<Verification Result 2>

Table 3 shows a verification result.

TABLE 3

| | Length in circumferential direction | | | |
|---|---|---|---|---|
| | first time | | second time | |
| | purge portion | non-purge portion | purge portion | non-purge portion |
| Comparative example 2 | 1 mm | 1 mm | 1 mm | 1 mm |
| Exemplary embodiment 2 | 2.5 mm | 9 mm | 1.5 mm | 9 mm |

| | Length in circumferential direction | | | |
|---|---|---|---|---|
| | third time | | fourth time | |
| | purge portion | non-purge portion | purge portion | non-purge portion |
| Comparative example 2 | 1 mm | 1 mm | 1 mm | 1 mm |
| Exemplary embodiment 2 | 1 mm | 9 mm | — | — |

| | Length in circumferential direction fifth time | | Number | Amount of toner |
|---|---|---|---|---|
| | purge portion | non-purge portion | of times | adhering to charging roller |
| Comparative example 2 | 1 mm | 1 mm | 5 times | medium |
| Exemplary embodiment 2 | — | — | 3 times | none |

In the comparative example 2, as described above in the exemplary embodiment 1, it is thought that, due to the averaging rotation distance after the first purge being insufficient, the second purge penetrated the contact portion P6 of the cleaning blade 51 before a cleaning blocking layer was formed and, then, toner slipped through the contact portion P6.

In the exemplary embodiment 2, toner adhesion to the developing roller 41 due to faulty cleaning did not occur.

This is because, while the cleaning member bears the first purge amount, a blocking layer is sufficiently formed owing to the subsequent averaging rotation of the non-purge portion being long and, additionally, the purge amount at the second time and subsequent times is gradually reduced, thus facilitating cleaning.

From the present verification, it was found that, if the non-purge distance (the distance of the averaging rotation) was larger by a predetermined distance than the purge distance, it was possible to form a cleaning blocking layer and gradually reducing the purge amount at the second time and subsequent times more facilitated cleaning. Additionally, it was possible to make the time desired for formation of the blocking layer more shortened than in the configuration of the exemplary embodiment 1-1, and a result of the present verification was better than in the configuration of the exemplary embodiment 1-2.

The configuration of the exemplary embodiment 2 has the following characteristics.

The image forming apparatus 100 includes the photosensitive member 1, which serves as a rotatable image bearing member, and the exposure device 3, which serves as an exposure unit configured to form an electrostatic latent image on the surface of the photosensitive member 1 by exposing the surface of the photosensitive member 1. The image forming apparatus 100 includes the developing roller 41, which serves a rotatable developer bearing member configured to, at a developing portion P3, supply toner to the surface of the photosensitive member 1 and develop the electrostatic latent image as a toner image. The image forming apparatus 100 includes the cleaning blade 51, which serves as a cleaning member configured to form a contact portion P6 by coming into contact with the photosensitive member 1 and, at the contact portion P6, remove toner adhering to the surface of the photosensitive member 1. The image forming apparatus 100 includes the control unit 202, which controls the following operations by causing the photosensitive member 1 and the developing roller 41 to rotate and controlling the exposure device 3. The control unit 202 performs control to enable performing (i) an image forming operation which forms a toner image on a recording material, and (ii) a toner supply operation which is an operation different from the image forming operation and which supplies the toner to the contact portion P6 by moving the toner from the developing roller 41 to the photosensitive member 1. A region of the photosensitive member 1 facing the developing roller 41 at the developing portion P3 in a state in which the photosensitive member 1 and the developing roller 41 are rotating is defined as a first region. Then, a region of the photosensitive member 1 facing the developing roller 41 at the developing portion P3 after a region of the developing roller 41 facing the first region makes one revolution is defined as a second region. Additionally, a region of the photosensitive member 1 between the first region and the second region in a rotational direction of the photosensitive member 1 is defined as a third region. When the toner supply operation is performed, the control unit 202 forms, in the third region, a toner supply pattern which includes a first pattern, a second pattern, a third pattern, and a fourth pattern mentioned below. The first pattern is for exposing a part of the surface of the photosensitive member 1 by the exposure device 3. The second pattern is a pattern for not exposing a part of the surface of the photosensitive member 1 after the first pattern in the rotational direction of the photosensitive member 1. The third pattern is a pattern for exposing a part of the surface of the photosensitive member 1 by the exposure device 3 after the second pattern in the rotational direction of the photosensitive member 1. The fourth pattern is a pattern for not exposing a part of the surface of the photosensitive member 1 after the third pattern in the rotational direction of the photosensitive member 1. The toner supply pattern is configured in such a manner that the length of the second pattern is larger than the length of the first pattern in the rotational direction of the photosensitive member 1 and the length of the fourth pattern is larger than the length of the third pattern in the rotational direction of the photosensitive member 1. The length of the third pattern in the rotational direction of the photosensitive member 1 is smaller than the length of the first pattern in the rotational direction.

With the above-described configuration employed, it is possible to more effectively prevent or reduce the occurrence of an adverse effect in images resulting from faulty cleaning.

An exemplary embodiment 3 is characterized by further changing a toner supply pattern in a configuration similar to that in the exemplary embodiment 1.

The exemplary embodiment 2 is, as described above, characterized by fixing the non-purge width B and making the purge width A smaller as the next time advances. The exemplary embodiment 3 is characterized by, specifically, changing control of patterns subsequent to the first pattern and the second pattern of the toner supply pattern as illustrated in FIG. 8C. There are areas of a purge width C in the rotational direction subjected to development as the third pattern and a non-purge width D in the rotational direction not subjected to development as the fourth pattern, and the lengths thereof are in a relationship of “C<D”. After that, there are areas of a purge width E in the rotational direction subjected to development as the fifth pattern and a non-purge width F in the rotational direction not subjected to development as the sixth pattern, and the lengths thereof are in a relationship of “E<F”. In this way, the control unit 202 performs control in such a manner that the relationship between the purge width in the rotational direction subjected to development at the n-th time and the purge width in the rotational direction subjected to development at the (n+1)-th time is “n>n+1”. Additionally, the control unit 202 performs control to discharge toner t in such a manner that the relationship between the non-purge width in the rotational direction not subjected to development at the n-th time and the non-purge width in the rotational direction not subjected to development at the (n+1)-th time becomes “n>n+1”. Thus, the respective lengths of the purge portion and the non-purge portion always enter into a relationship of “purge width<non-purge width”, and, additionally, a comparison with a comparative example 3 was made to determine whether, even if both the purge portion and the non-purge portion were repetitively shortened, charging roller smudge caused by faulty cleaning was diminished as with the exemplary embodiment 1 and the exemplary embodiment 2. The comparison was also concurrently made with two types of configurations of the exemplary embodiment 3 and one type of modification example of the exemplary embodiment 3.

The comparative example 3 was set to the purge width A/C/E=2.5 mm/1.5 mm/1 mm, the non-purge width B/D/F=9 mm/1 mm/1 mm, and the number of times of repetition=3 times.

The exemplary embodiment 3-1 was set to the purge width A/C/E=2.5 mm/1.5 mm/1 mm, the non-purge width B/D/F=9 mm/3 mm/1 mm, and the number of times of repetition=3 times.

The exemplary embodiment 3-2 was set to the purge width A/C/E=2.5 mm/1.5 mm/1 mm, the non-purge width B/D/F=9 mm/7 mm/5 mm, and the number of times of repetition=3 times.

The modification example 1 was set to the purge width A/C/E=2.5 mm/1 mm/1.5 mm, the non-purge width B/D/F=9 mm/5 mm/7 mm, and the number of times of repetition=3 times.

In all of these cases, the amount of toner supply to be used for comparison was set identical (5 mm).

<Verification Result 3>

Table 4 shows a verification result.

TABLE 4

| | Length in circumferential direction | | | | | | Number | Amount of toner |
|---|---|---|---|---|---|---|---|---|
| | first time | | second time | | third time | | | |
| | purge portion | non-purge portion | purge portion | non-purge portion | purge portion | non-purge portion | of times | adhering to charging roller |
| Comparative example 3 | 2.5 mm | 9 mm | 1.5 mm | 1 mm | 1 mm | 1 mm | 3 times | medium |
| Exemplary embodiment 3-1 | 2.5 mm | 9 mm | 1.5 mm | 3 mm | 1 mm | 1.5 mm | 3 times | none |
| Exemplary embodiment 3-2 | 2.5 mm | 9 mm | 1.5 mm | 7 mm | 1 mm | 5 mm | 3 times | none |
| Modification example 1 | 2.5 mm | 9 mm | 1 mm | 5 mm | 1.5 mm | 7 mm | 3 times | none |

In the comparative example 3, it is thought that, due to the averaging rotation distance after the second purge being insufficient, the third purge penetrated the contact portion P6 of the cleaning blade 51 before a cleaning blocking layer was formed and, then, toner slipped through the contact portion P6.

On the other hand, in the exemplary embodiment 3-1, there was no occurrence of faulty cleaning. This means that a blocking layer is formed to some extent at the nip portion during the first time of purge, the averaging rotation distance after the second purge is able to be secured from a relationship of "C<D", and a cleaning blocking layer is able to be more effectively formed than in the comparative example 3. Then, from a relationship of "E<F", cleaning is able to be performed to some extent even during the third purge. Here, in the exemplary embodiment 3-1, while, during the first time of purge, the averaging ratio of 70% is secured, during the second time and the third time of purge, the averaging ratio falls below 70%. Since, during the first time of purge, the foundation of a blocking layer is able to be built, the conditions for the second time and the third time of purge are somewhat relaxed. Accordingly, in the toner supply operation performed after the first time of purge, if "C<D" and "E<F" are satisfied, even when the averaging ratio becomes smaller than in the first time of purge, it is possible to prevent or reduce the occurrence of adverse effects.

Additionally, even in the exemplary embodiment 3-2, toner adhesion to the charging roller 2 caused by faulty cleaning did not occur. The exemplary embodiment 3-2 has a more suitable condition than that of the exemplary embodiment 3-1 and secures the averaging ratio of 70% during all of the first time, the second time, and the third time of purge. This results in a state in which, as a tonner supply condition for the nip portion, distances of the non-purge portions after the first time, the second time, and the third time of purge are sufficient and, in all of these cases, a sufficient cleaning blocking layer has been formed. However, the rotation time of the photosensitive member 1 becomes somewhat longer than in the exemplary embodiment 3-1.

Next, the modification example 1 is considered. A difference between the exemplary embodiment 3-2 and the modification example 1 is that the condition for the second time and the condition for the third time are switched around. Accordingly, the modification example 1 is characterized in that there is a relationship of "C<E" and, in the toner supply operation, toner purge which is performed later is larger in the amount of supplied toner. Even in the modification example 1, there was no occurrence of adverse effects in images and a suitable blocking layer was able to be formed. This suggests that, in the first time to the second time of purge, a relationship of "A<C" is maintained and, at this point of time, the formation of a blocking layer is advancing to some extent. Then, it is inferred that, even if the amount of supplied toner has increased in the second time to the third time of purge, it is still possible to prevent or reduce toner from slipping through the contact portion. As long as it is a condition advantageous for the formation of a blocking layer, even a condition such as that in the modification example 1 is applicable. However, it may be desirable to satisfy a relationship of "A<B, C<D, and E<F".

Accordingly, performing the above-described control enables, in addition to obtaining the advantageous effect in the exemplary embodiment 1, reducing an extra rotation of the process cartridge 7 and preventing or reducing abrasion of the photosensitive member 1 and deterioration of toner t.

The configuration of the exemplary embodiment 3 has the following characteristics.

The image forming apparatus 100 includes the photosensitive member 1, which serves as a rotatable image bearing member, and the exposure device 3, which serves as an exposure unit configured to form an electrostatic latent image on the surface of the photosensitive member 1 by exposing the surface of the photosensitive member 1. The image forming apparatus 100 includes the developing roller 41, which serves a rotatable developer bearing member configured to, at a developing portion P3, supply toner to the surface of the photosensitive member 1 and develop the electrostatic latent image as a toner image. The image forming apparatus 100 includes the cleaning blade 51, which serves as a cleaning member configured to form a contact portion P6 by coming into contact with the photosensitive member 1 and, at the contact portion P6, remove toner adhering to the surface of the photosensitive member 1. The image forming apparatus 100 includes the control unit 202, which controls the following operations by causing the photosensitive member 1 and the developing roller 41 to rotate and controlling the exposure device 3. The control unit 202 performs control to enable performing (i) an image forming operation which forms a toner image on a recording material, and (ii) a toner supply operation which is an operation different from the image forming operation and which supplies the toner to the contact portion P6 by moving the toner from the developing roller 41 to the photosensitive member 1. A region of the photosensitive member 1 facing the developing roller 41 at the developing portion P3 in a state in which the photosensitive member 1 and the developing roller 41 are rotating is defined as a first region. Then, a region of the photosensitive member 1 facing the developing roller 41 at the developing portion P3 after a region of the developing roller 41 facing the first region makes one revolution is defined as a second region. Additionally, a region of the photosensitive member 1 between the first region and the second region in a rotational direction of the photosensitive member 1 is defined as a third region. When the toner supply operation is performed, the control unit 202 forms, in the third region, a toner supply pattern which includes a first pattern, a second pattern, a third pattern, and a fourth pattern mentioned below. The first pattern is for exposing a part of the surface of the photosensitive member 1 by the exposure device 3. The second pattern is a pattern for not exposing a part of the surface of the photosensitive member 1 after the first pattern in the rotational direction of the photosensitive member 1. The third pattern is a pattern for exposing a part of the surface of the photosensitive member 1 by the exposure device 3 after the second pattern in the rotational direction of the photosensitive member 1. The fourth pattern is a pattern for not exposing a part of the surface of the photosensitive member 1 after the third pattern in the rotational direction of the photosensitive member 1. The toner supply pattern is configured in such a manner that the length of the second pattern is larger than the length of the first pattern in the rotational direction of the photosensitive member 1 and the length of the fourth pattern is larger than the length of the third pattern in the rotational direction of the photosensitive member 1. The length of the fourth pattern in the rotational direction of the photosensitive member 1 is smaller than the length of the second pattern in the rotational direction.

With the above-described configuration employed, it is possible to more effectively prevent or reduce the occurrence of an adverse effect in images resulting from faulty cleaning.

Furthermore, while, in the exemplary embodiment 3, a verification was performed with the amount of toner supply set to 5 mm in either case, the exemplary embodiment 3 is not limited to this, and it is conceivable that, depending on configurations of the image forming apparatus, it may be preferable to increase or decrease the amount of toner supply. However, with regard to combinations described in the exemplary embodiment 3, similar advantageous effects are obtainable.

Moreover, while exemplary embodiments have been described with regard to an in-line type color image forming apparatus, in which image forming portions S are linearly arranged side by side, the exemplary embodiments can also be applied to a rotary-type color image forming apparatus. Moreover, the contents of the respective exemplary embodiments can also be applied to a monochrome image forming apparatus, in which only one image forming portion S is arranged. In that case, instead of the configuration using the intermediate transfer belt 31, the configuration using a recording material conveyance member can be employed, and, a configuration which directly transfers a toner image to a recording material P without using a recording material conveyance member can also be employed.

Moreover, while a cartridge in the form of the process cartridge 7 has been employed, a two-member cartridge type in which each of the photosensitive member unit 8 and the developing device 4 is configured to be independently attachable to and detachable from the image forming apparatus 100 can also be employed. In that case, a configuration in which, in a case where the photosensitive member unit 8 is a new product, a toner supply operation in each of the exemplary embodiments is performed can be employed, or a configuration in which, in a case where the developing device 4 is a new product, a toner supply operation in each of the exemplary embodiments is performed can be employed. The former configuration is employed because, as described in each of the exemplary embodiments, a blocking layer is still not formed at the contact portion P6 between the cleaning blade 51 and the photosensitive member 1. The latter configuration is employed because, even if a blocking layer is already formed, in a case where the developing device 4 is a new product, in response to new-product toner t being supplied to the contact portion P6, the blocking layer may be broken by new-product toner t, which is high in charge amount. Therefore, a configuration in which, even in a case where the developing device 4 is a new product, a toner supply operation in each of the exemplary embodiments is performed can be employed. Moreover, a configuration in which only the photosensitive member unit 8 is fixed to the image forming apparatus and, thus, the photosensitive member unit 8 is not able to be attached to and detached from the image forming apparatus can be employed.

According to aspects of the present disclosure, it is possible to prevent or reduce the occurrence of an adverse effect in images resulting from faulty cleaning.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-169335 filed Sep. 29, 2023, which is hereby incorporated by reference herein in its entirety.

What is claimed is:

1. An image forming apparatus comprising:

a rotatable image bearing member;

an exposure unit configured to form an electrostatic latent image on a surface of the image bearing member by exposing the surface of the image bearing member;

a rotatable developer bearing member configured to, at a developing portion, supply toner to the surface of the image bearing member and develop the electrostatic latent image as a toner image;

a cleaning member configured to form a contact portion by coming into contact with the image bearing member and, at the contact portion, remove toner adhering to the surface of the image bearing member; and a control unit configured to, by causing the image bearing member and the developer bearing member to rotate and controlling the exposure unit, perform control to enable performing (i) an image forming operation which forms the toner image on a recording material, and (ii) a toner supply operation which is an operation different from the image forming operation and which supplies the toner to the contact portion by moving the toner from the developer bearing member to the image bearing member, wherein a region of the image bearing member facing the developer bearing member at the developing portion in a state in which the image bearing member and the developer bearing member are rotating is defined as a first region, a region of the image bearing member facing the developer bearing member at the developing portion after a region of the developer bearing member facing the first region makes one revolution is defined as a second region, and a region of the image bearing member between the first region and the second region in a rotational direction of the image bearing member is defined as a third region, wherein, when the toner supply operation is performed, the control unit performs control to form, in the third region, a toner supply pattern which includes a first pattern for exposing a part of the surface of the image bearing member by the exposure unit, a second pattern for not exposing a part of the surface of the image bearing member after the first pattern in the rotational direction or for exposing a part of the surface of the image bearing member with an exposure amount smaller than an exposure amount with which the first pattern is used for exposure, a third pattern for exposing a part of the surface of the photosensitive member by the exposure unit after the second pattern in the rotational direction, and a fourth pattern for not exposing a part of the surface of the photosensitive member after the third pattern in the rotational direction or for exposing a part of the surface of the image bearing member with an exposure amount smaller than an exposure amount with which the third pattern is used for exposure, and wherein the toner supply pattern is configured so a length of the second pattern is larger than a length of the first pattern in the rotational direction and that a length of the fourth pattern is larger than a length of the third pattern in the rotational direction.

2. The image forming apparatus according to claim 1, wherein the length of the third pattern in the rotational direction is smaller than the length of the first pattern in the rotational direction.

3. The image forming apparatus according to claim 1, wherein the length of the fourth pattern in the rotational direction is smaller than the length of the second pattern in the rotational direction.

4. The image forming apparatus according to claim 1, further comprising a memory configured to store information about a status of use of the toner, wherein the control unit performs control to perform the toner supply operation using the toner supply pattern based on the information stored in the memory.

5. The image forming apparatus according to claim 4, wherein the information is information for determining whether the toner is in a beginning-of-use state, and wherein, in a case where the toner is in the beginning-of-use state, the control unit performs control to perform the toner supply operation using the toner supply pattern.

6. The image forming apparatus according to claim 5, wherein, in a case where the toner is not in the beginning-of-use state, the control unit performs control to perform a second toner supply operation different from a first toner supply operation, which is the toner supply operation using the toner supply pattern, and wherein the control unit performs control so the second toner supply operation is performed using a second toner supply pattern different from a first toner supply pattern which is the toner supply pattern.

7. The image forming apparatus according to claim 1, wherein a length in a rotational axis direction of the image bearing member of the first pattern is a length available for image formation in the image forming operation.

* * * * *